(12) United States Patent
Weigelt et al.

(10) Patent No.: US 11,321,603 B2
(45) Date of Patent: May 3, 2022

(54) METHOD FOR GENERATING A TIME-DEPENDENT SIGNAL ON A CAPACITIVE SURFACE SENSOR AND METHOD FOR IDENTIFYING A CARD-LIKE OBJECT, AND CARD-LIKE OBJECT AND USE THEREOF

(71) Applicant: Prismade Labs GMBH, Chemnitz (DE)

(72) Inventors: Karin Weigelt, Chemnitz (DE); Jan Thiele, Chemnitz (DE)

(73) Assignee: PRISMADE LABS GMBH, Chemnitz (DE)

(*) Notice: Subject to any disclaimer, the term of this patent is extended or adjusted under 35 U.S.C. 154(b) by 4 days.

(21) Appl. No.: 16/482,196

(22) PCT Filed: Jan. 31, 2018

(86) PCT No.: PCT/EP2018/000044
§ 371 (c)(1),
(2) Date: Jul. 30, 2019

(87) PCT Pub. No.: WO2018/141478
PCT Pub. Date: Aug. 9, 2018

(65) Prior Publication Data
US 2020/0117972 A1    Apr. 16, 2020

(30) Foreign Application Priority Data

Jan. 31, 2017 (EP) ................................ 17000167
Aug. 21, 2017 (EP) ................................ 17001423

(51) Int. Cl.
*G06K 19/077* (2006.01)
*G06K 7/08* (2006.01)

(52) U.S. Cl.
CPC ....... *G06K 19/07756* (2013.01); *G06K 7/081* (2013.01); *G06K 7/089* (2013.01)

(58) Field of Classification Search
CPC ... G06K 19/07706; G06K 7/081; G06K 7/089
See application file for complete search history.

(56) References Cited

U.S. PATENT DOCUMENTS 7,084,933 B2 * 8/2006 Oh ...................... G02F 1/13338
349/12
10,224,974 B2 * 3/2019 Mercer ................. H04W 52/18
(Continued)

FOREIGN PATENT DOCUMENTS

DE    102012023082 A1    5/2013
DE    102013101881 A1    8/2014
(Continued)

OTHER PUBLICATIONS

International Search Report dated Jun. 12, 2018 for International Application No. PCT/EP2018/000044 filed Jan. 31, 2018.

*Primary Examiner* — Thien M Le
*Assistant Examiner* — Asifa Habib
(74) *Attorney, Agent, or Firm* — Blue Filament Law PLLC

(57) ABSTRACT

A method for generating a time-dependent signal on a capacitive surface sensor is provided and a method for identifying a card-like object, as well as a card-like object and the use thereof are also provided.

18 Claims, 27 Drawing Sheets

(56) References Cited

U.S. PATENT DOCUMENTS

Figure 1:
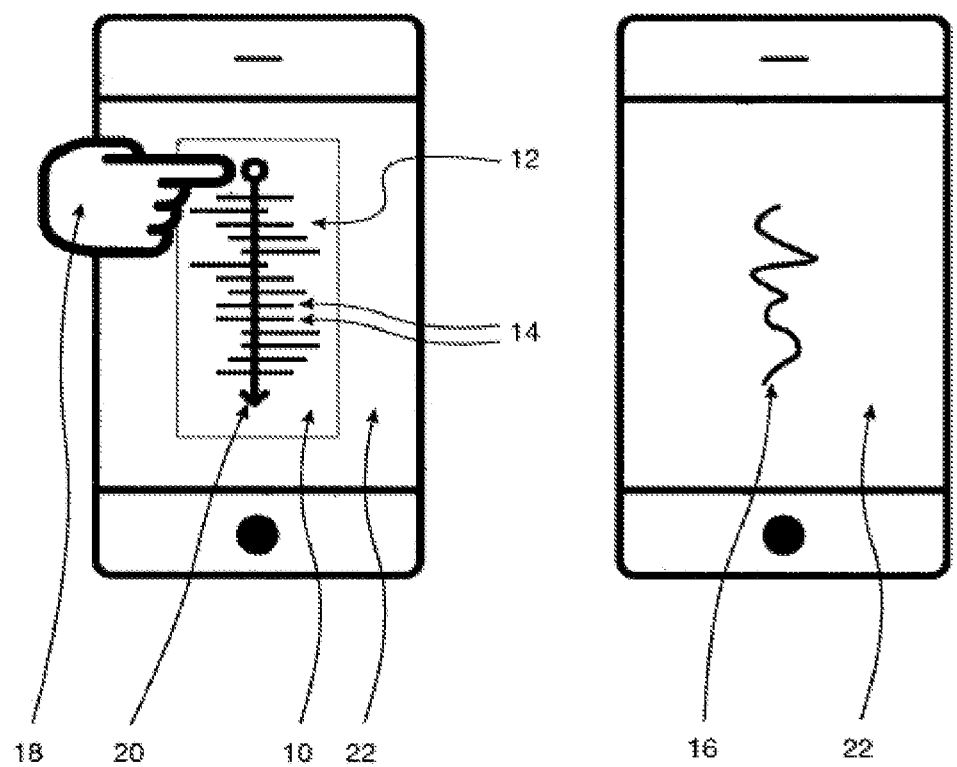

| | | | |
|---|---|---|---|
| 10,337,886 B2 * | 7/2019 | Harper | G01R 29/12 |
| 10,411,759 B2 * | 9/2019 | Thiele | G06K 19/07788 |
| 10,644,697 B2 * | 5/2020 | Almholt | H03K 17/955 |
| 10,761,801 B2 * | 9/2020 | Calatayud | H03K 17/941 |
| 10,909,433 B2 * | 2/2021 | Sajjaanantakul | G06K 19/0723 |
| 2010/0045627 A1 | 2/2010 | Kennedy | |
| 2011/0063242 A1 * | 3/2011 | Bytheway | G06F 3/0444 |
| | | | 345/174 |
| 2011/0253789 A1 * | 10/2011 | Thiele | G06K 19/067 |
| | | | 235/441 |
| 2012/0125993 A1 * | 5/2012 | Thiele | B42D 25/47 |
| | | | 235/375 |
| 2012/0306813 A1 * | 12/2012 | Foerster | G06K 19/067 |
| | | | 345/174 |
| 2014/0332587 A1 | 11/2014 | Thiele et al. | |
| 2015/0199042 A1 * | 7/2015 | Standing | H01Q 1/245 |
| | | | 345/174 |

FOREIGN PATENT DOCUMENTS

| | | |
|---|---|---|
| EP | 0422482 A2 | 4/1991 |
| EP | 2431923 A1 | 3/2012 |
| EP | 2458526 A1 | 5/2012 |
| WO | 2011154524 A1 | 12/2011 |

* cited by examiner

METHOD FOR GENERATING A TIME-DEPENDENT SIGNAL ON A CAPACITIVE SURFACE SENSOR AND METHOD FOR IDENTIFYING A CARD-LIKE OBJECT, AND CARD-LIKE OBJECT AND USE THEREOF

The invention relates to a method for generating a time-dependent signal on a capacitive surface sensor and a method for identifying a card-like object, as well as a card-like object and its use.

The invention is part of the technical field of auto-identification technologies. Known technologies for the automatic device-based identification of objects are, for example, optical codes or RFID tags (radio frequency identification). Optical codes are known in the form of classic barcodes (barcodes) or 2D barcodes. The disadvantage of optical codes is first and foremost the ease of copying, so that corresponding marked objects are not optimally protected against attempts of forgery.

RFID tags are electronic circuits that are readout using radio waves. These tags are much more forgery-proof compared to optical codes. However, for many mass applications, RFID tags are too expensive, especially because they often require applications in large quantities. As another alternative auto-identification technology, capacitive data carriers have been developed in recent years that combine the advantages of low cost and improved forgery protection. Capacitive data carriers in various forms are known from the prior art, as well as methods for their production, and methods and systems for identifying the data carriers.

WO 2011/154524 A1 discloses a system with capacitive information carrier for capturing information. The invention describes a system comprising a capacitive information carrier in which an electrically conductive layer is arranged on an electrically nonconductive substrate and a surface sensor, wherein the information carrier is present in contact with the surface sensor. The electrically conductive layer comprises a touch structure comprising a touch point, a coupling surface and a conducting path. Such a structure can be evaluated with a data processing system connected to the surface sensor and processed by software. The resulting touch inputs on the surface sensor generate a static image of multiple touch points, which can be evaluated by the data processing system.

DE 10 2012 023 082 A1 discloses the interaction of a flat, portable data carrier with a terminal. The portable data carrier, which may be a value document, for example, comprises an electrically conductive structure which is provided on at least one surface and/or in the interior of the data carrier, with individual areas of the conductive structure being electrically conductively or capacitively interconnected. The terminal has a touch-sensitive capacitive surface, in particular a capacitive display.

DE 10 2013 101 881 A1 describes a multilayer body with a carrier and an electrically conductive layer arranged thereon, comprising an information area and a background area, which are galvanically separated from one another. A first zone with electrically conductive material is provided in each information area with its electrically conductive material being connected over the entirety of said zone. In each background area a majority of second zones of electrically conductive material is provided, which are galvanically separated from one another. This multi-layer body can be read out by means of a capacitive sensing input device.

These two applications are characterized in that the electrically conductive structure, which represents the information area, is electrically conductively connected. The static image, which generates the electrically conductive structure on a capacitive terminal, is evaluated in each case.

US 20100045627 A1 describes a method which describes the generation of a touch signal on a touch screen by the shape or pattern of an object as well as its identification by software and the triggering of an associated action. In this case, the bearing surface of the entire object generates an input signal on the touch screen.

The prior art objects and devices mentioned are objects or devices that are either entirely or partially made of electrically conductive material and cause a particular input pattern on a capacitive touch screen. This input pattern, or the so-called "footprint", is evaluated with regard to the relative position of the contact surfaces and associated with a data record or an action. It is always a static input pattern which is present at a given time that is evaluated. Since in the systems mentioned always a static input pattern is evaluated, this can also be imitated. Thus, in the systems which are known from the prior art, there is no immunity against forgery for safety-relevant applications.

A disadvantage of the devices of the prior art is that the limited data density, that is, the number of different identifiers (IDs) per area is limited by the type of coding, which is usually a geometric coding. A larger number of different IDs results in a large area requirement, which cannot be guaranteed in many applications. In addition, ease of use is not optimal for some of the prior art systems because the user must be aware of which part of the data carrier must and may rest on the touch screen and which must not.

The object of the invention is to provide a method for generating a time-dependent signal on a capacitive surface sensor and a method for identifying a card-like object, as well as a card-like object, which do not have the disadvantages and deficiencies of the prior art and in addition are particularly forgery-proof, allow the storage of large amounts of data in a small space and are designed to be particularly user-friendly.

DESCRIPTION OF THE INVENTION

According to the invention, a method for generating a time-dependent signal on a capacitive surface sensor is provided for achieving said object, wherein a card-like object, which can be placed on the capacitive surface sensor, has an electrically conductive structure comprising a plurality of individual elements, which are arranged on the card-like object, wherein the time-dependent signal is established by the arrangement of the individual elements on the card-like object and generated by a relative movement between an input means and the card-like object.

For the purposes of the invention, a card-like object is preferably a three-dimensional product which, in a particularly preferred embodiment of the invention, has the form of a card, for example a credit card. The person of ordinary skill in the art will appreciate that a card is preferably configured to be flat, that is, has a height that is significantly less than a length or width of the preferred object. In particular, a card-like object may be configured to be planar, that is to say have a large base area with respect to a small height, and wherein it is particularly preferred according to the invention if the card-like object with the base area is placed on a surface sensor, thereby advantageously creating a large active surface for the interaction of object and surface sensor. In a further embodiment it is preferred that the card-shaped object has a length that is significantly greater than the width of the object. For example, in a typical credit card, a length is 86 mm and a width is 54 mm, which corresponds to a ratio of about 1.6. For the purposes of the invention, a conventional credit card is an example of a card-shaped object in which a length is significantly greater than a width of the object. For example, it may mean objects in which a ratio of length to width is greater than 1.5. However, it may also be preferred for the purposes of the invention that the card-shaped object has a square base area, which is preferably characterized by a ratio between the length and width of the object of 1. In certain embodiments, it is preferred that the card-shaped object is a web-shaped material that can be provided on a roll, for example. It is particularly preferred that the card-like object is configured so that it can be placed on a surface sensor, without damaging or destroying it. It is preferred that the card-like object comprises a material which may be selected, for example, from a group comprising, but not limited to, paper, cardboard, plastic, textile.

For the purposes of the invention, it is preferred that a time-dependent signal preferably represents a time-varying signal, that is to say a signal which changes over time by itself or by an external influence. In the context of the present invention, the time-dependent signal is established by the arrangement of the individual elements on the card-like object and generated by a relative movement between an input means and the card-like object. For the purposes of the invention, it is preferred that the electrically conductive structure comprises at least two individual elements. However, for some applications of the invention, for the purposes of the invention, it may be preferred for the electrically conductive structure to comprise a larger number of individual elements. For various applications, for the purposes of the invention, it may also be preferred that a card-like object comprises more than one electrically conductive structure. These structures can be arranged on the object, for example, parallel to one another or arranged rotated at an angle to one another, whereby complex interaction possibilities between the individual electrically conductive structures can result.

For the purposes of the invention, it may be preferred that the individual elements that form the electrically conductive structure are similar to one another, that is to say for example, consist of strips with different length and/or width, which may be arranged side by side and, for example, have a same or different spacing between them. Such individual elements are preferably similar to one another in that all individual elements are line-shaped, even if they may differ in their length. However, it may also be preferred that the individual elements of an electrically conductive structure are not similar to one another, i. e., have different shapes.

In a further preferred configuration of the invention, the individual elements of the electrically conductive structure are galvanically separated from one another. The preferred spatial and/or galvanic separation of the individual elements of the electrically conductive structure from one another can be achieved, for example, in that two individual elements in each case are spaced apart from one another, wherein said spacing between the individual elements within an electrically conductive structure can be the same or different. For the purposes of the invention, it is particularly preferred that the electrically conductive structure comprises at least two individual elements which are galvanically separated from one another, wherein the individual elements are arranged in one plane. For the purposes of the invention, the term "in one plane" preferably means that the electrically conductive structure is arranged, for example, on the front and/or the back of the card-like object, which is preferably configured to be planar.

For the purposes of the invention, the term "capacitive surface sensor" preferably designates such devices with touch screen which are capable of perceiving external impacts or influences, for example contacts of the touch screen area and evaluating them by means of affiliated logic. Such surface sensors are used, for example, to operate machines more easily. In order to make an input to a capacitive screen, which is preferably also referred to as touch screen or surface sensor, special styli or similar devices can be used in addition to the fingers. For the purposes of the invention, fingers and special styli are preferably referred to as input means. These input means are preferably capable of changing a capacitive coupling between row and column electrodes within the surface sensor. Such input means, which, for the purposes of the invention, are preferably adapted to generate a time-dependent signal by a relative movement between the input means and the card-like object, are not described in the prior art. The capacitive, preferably touch-sensitive screen is preferably adapted to detect the position of the input means.

Typically, surface sensors are provided in an electrical device, which may be, but not limited to, smartphones, cell phones, displays, tablet PCs, tablet notebooks, touchpad devices, graphics tablets, televisions, PDAs, MP3 players, trackpads, and/or capacitive input devices. Touch screens are preferably also referred to as touch-sensitive screens, surface sensors or sensor screens. A surface sensor does not necessarily have to be used in conjunction with a display or a touch screen. It may also be preferred for the purposes of the invention that the surface sensor is visibly or non-visibly integrated in devices, objects and/or apparatuses.

For the purposes of the invention, for example, it may be preferred to use multi-touch-capable surface sensors. Such surface sensors are preferably adapted to identify multiple touches simultaneously, for example, allowing elements displayed on a touch screen to be rotated or scaled.

For the purposes of the invention, for example, it may also be preferred to use surface sensors which are not multi-touch-capable. Especially older devices, such as, for example, smartphones, can only identify one touch at a time. Information carriers are known from the prior art which generate a static image of a plurality of touch points on the surface sensor. Such information carriers are incompatible with older devices whose surface sensor is not multi-touch-capable. It was completely surprising that the method according to the invention for generating a time-dependent signal on a capacitive surface sensor by means of a card-like object is compatible with these so-called single-touch-capable surface sensors. The expression that the proposed method is compatible with these single-touch-capable surface sensors preferably means for the purposes of the invention that such surface sensors can be used for carrying out the method or that the proposed method "runs" on these devices.

In particular, surface sensors comprise at least one active circuit, which is preferably referred to as a touch controller, which may be connected to a structure of electrodes. Surface sensors are known in the prior art whose electrodes comprise groups of electrodes which differ, for example, from one another in their function. For example, these electrodes may be transmitting and receiving electrodes which, in a particularly preferred arrangement, may be arranged in column and row form, that is to say in particular form node points at which at least one transmitting and one receiving electrode intersect each other or overlap. Preferably, the crossing transmitting and receiving electrodes in the area of the nodes are aligned with one another so that they form essentially 90° angles. For the purposes of the invention, it is particularly preferred for an electrostatic field to form between the transmitting and receiving electrodes of the surface sensor which electrostatic field is sensitive to changes, for example, by bringing the surface of a surface sensor into contact with an electrically conductive device or through its grounding, that is to say a discharge of electrical charge.

For the purposes of the invention, it is preferred that the touch controller preferably controls the electrodes in such a way that a signal is transmitted in each case between one or more transmitting electrodes and one or more receiving electrodes, which signal can be preferably an electrical signal, for example a voltage, a current or a potential (difference). These electrical signals in a capacitive surface sensor are preferably evaluated by the touch controller and processed for the operating system of the device. The information transmitted by the touch controller to the operating system describe so-called individual "touches", which can each be thought of as single identified touches. These touches are preferably characterized by the parameters x coordinate of the touch, y coordinate of the touch, time stamp of the touch and type of touch. The parameters x and y coordinate describe the position of the input on the touch screen. Each coordinate pair is preferably associated with a time stamp which describes when the input has taken place at the corresponding location. The person skilled in the art knows that the following types of touch signals exist: touch start, touch move, touch end and touch cancel. The term "touch start" preferably describes the start of a touch input by the user. This can be done for example by a touch of the user. The term "touch move" preferably describes the movement of an input on the touch screen without, for example, lifting the finger from the touch screen. The term "touch end" preferably describes the end of a touch input, which can be done for example by lifting a finger from the touch screen by a user. The term "touch cancel" preferably describes a state in which the touch inputs are aborted by the touch controller. This may be necessary, for example, if too many touch inputs are detected simultaneously. For the purposes of the invention, the time-dependent signal preferably comprises a quantity of such touches or touch inputs. In other words, it is preferred for the purposes of the invention that the time-dependent signal is formed by a quantity of touches and/or touch inputs. These signals within the surface sensor, which are time-dependent signals in the context of the invention, can be established by the arrangement of the individual elements on the card-like object.

For the purposes of the invention, it is preferred that the time-dependent signal which is generated on a surface sensor by a relative movement between an input means and the card-like object, is changed by the arrangement of the individual elements on the card-like object and differs in particular from an input of an input means on a surface sensor, which is direct, that is to say preferably without the use of a card-like object. In particular, two situations are distinguished: on the one hand a direct dynamic input on a surface sensor with an input means, and on the other hand a dynamic input in which a card-like object is interposed between the input means and the surface sensor. For the purposes of the invention, it is preferred to designate the direct input with an input means on the surface sensor as the reference input. For the purposes of the invention, it is preferred that the arrangement of the individual elements on the card-like object causes a change in the direct dynamic input, as a result of which a time-dependent signal is generated on the surface sensor. In a preferred embodiment of the invention, it is provided that the individual elements of the electrically conductive structure with respect to size, spacing and shape are formed so that the time-dependent signal resulting from the relative movement on the capacitive surface sensor is changed relative to the reference input with the input means which is done preferably without using the card-like object. For the purposes of the invention, this conversion process is referred to preferably as modulation, establishment, change, distortion or shift.

In a preferred configuration of the invention, the resulting time-dependent signal on the capacitive surface sensor with respect to position, speed, direction, shape, interruption of the signal, frequency and/or signal strength is at least partially changed relative to a reference signal, which is established by a reference input with the input means, which is done without using the card-like object. For the purposes of the invention, it is preferred that it is the resulting time-dependent signal, which can preferably be generated by the proposed method. Starting from an exemplary input in the form of a rectilinear line-shaped movement on an individual element of the electrically conductive structure, this means, preferably, for the purposes of the invention, that the generated time-dependent signal due to the modulation by the card-like object, or its electrically conductive structure, may have a different position, direction, shape and/or signal strength relative to the rectilinear line-shaped input of the input means, that is to say, for example, it is identified by the surface sensor as spatially offset, distorted and/or shifted, has a different shape than the rectilinear line-shaped movement, points in a different direction or has an unexpected signal strength.

For example, if a user sweeps over a capacitive surface sensor with his finger as an application example of an input means for the purposes of the invention, the surface sensor essentially detects this movement at the positions on the screen of the surface sensor which are actually touched by the finger, i. e., the input means. A rectilinear line-shaped movement of the finger is preferably detected by the surface sensor essentially as a rectilinear line-shaped movement. Such an input without the presence of a card-like object is preferably referred to as a reference input for the purposes of the invention.

In the context of the present invention, it is preferably provided that a card-like object is arranged between the input means and the surface sensor, wherein the card-like object can be placed in particular on the surface sensor. The card-like object comprises an electrically conductive structure comprising preferably electrically conductive individual elements. It is provided in a possible application example of the invention that the user of the card-like object or of the surface sensor moves a finger over the card-like object, in particular over the electrically conductive structure. Hereby, the card-like object preferably rests on the surface sensor, so that the individual elements of the electrically conductive structure, which the user touches, become "visible" to the surface sensor by being activated by the movement of the user's finger. The inventors have recognized that by using a card-like object comprising an electrically conductive structure, an input on a surface sensor can be changed compared to a reference input. This change is preferably referred to as modulation for the purposes of the invention. It preferably takes place in that the individual elements of the electrically conductive structure are activated by the contact with the input means, whereby the surface sensor can detect them, the resulting time-dependent signal being spatially distorted by the arrangement of the individual elements on the card-like object, for example, compared to a reference input. If, for example, an input means takes place along an imaginary straight line on the card-like object without electrical conductive structures, then the surface sensor would detect a rectilinear movement of the input means as a reference input. However, if a card-like object is arranged between the input means and the surface sensor, on which the individual elements of the electrically conductive structure are arranged, for example, on a left side of the card-like object, the surface sensor will, when an input means is moved on the card-like object, detect a resulting signal that is shifted to the left or distorted compared to the reference input. The time-dependent signal generated in the context of the present invention preferably corresponds to the detection of the relative movement between input means and card-like object after deflection, distortion and/or shift by the electrically conductive structure. It is time-dependent because there is a movement s(t), so that the detected signal is also time-dependent in that it preferably represents a function of time. For the purposes of the invention, this means preferably that the time-dependent signal corresponds to the time sequence of the input means on the card-like object, wherein the detected positions of the resulting time-dependent signal, which are characterized in particular by the x and y coordinates of the touches can be deflected, distorted and/or shifted by the electrical conductive structure compared with a reference signal which is generated without a card-like object. For the purposes of the invention, this distortion, deflection and/or shift is referred to preferably as a change in the position of the time-dependent signal.

For the purposes of the invention, it may also be preferred that deviations occur in the speed, that is to say, for example, a rapid movement of the input means is modulated into a slow time-dependent signal. It may also be preferred that the time-dependent signal has a specific speed profile. For example, if an input means takes place along an imaginary straight line on the card-like object without electrically conductive structures, then the surface sensor would detect a time-dependent signal representing a straight line and having a nearly constant speed as a reference input. If, however, a card-like object is arranged between the input means and the surface sensor on which the individual elements of the electrically conductive structure are arranged, for example, at specific spacings on the card-like object, the surface sensor will, when an input means is moved on the card-like object, detect a resulting signal that has a specific speed profile relative to the reference input. In this case, as it moves across the card-like object, the input means gradually comes into operative contact with the electrically conductive elements on the card-like object, i. e., the input means gradually covers the electrically conductive elements. When the input means reaches an electrically conductive individual element, the position of the resulting signal is preferably shifted in the direction of the individual element at this time.

In a specific example, the input means is moved along an imaginary straight line in the y direction at a constant speed on the card-like object. As long as the input means does not come into contact with electrically conductive elements, the resulting time-dependent signal is essentially characterized by touches which differ essentially by the time stamp and the respective y coordinates, the speed of the movement being essentially constant. When the input means reaches an electrically conductive individual element, at this time, preferably, the position of the resulting signal is shifted in the direction of the individual element, i. e., the single touch is shifted much more strongly with regard to the y coordinate compared to the preceding touches. Using the parameters of the individual touches of the resulting time-dependent signal, a speed profile can be calculated. For the purposes of the invention, it is preferred that fluctuations in the speed profile can be identified in particular when the input means comes into contact with electrically conductive individual elements.

For the purposes of the invention, it may also be preferred that the signal is interrupted, for example, if a continuous movement takes place on the electrically conductive structure of the card-like object, wherein the electrically conductive structure preferably purposely has gaps, so that the time-dependent signal, which is detected by the surface sensor, has interruptions and/or pauses, that is, for example, it is no longer continuous and/or, for example, it "jumps". In addition, it may be preferred that the generated time-dependent signal has interruptions due to the configuration of the electrically conductive structure on the card-like object. It may also be preferred that a regularly recurring sequence of signal portions is generated, which together form the time-dependent signal which can be associated with a frequency.

For the purposes of the invention, it is preferred that the input on the card-like object takes place with an input means. The movement of the input means on the card-like object may, for example, be a rectilinear movement in the form of a line. Such a line-shaped movement would be identified by a surface sensor as a line-shaped input, if it were performed directly on the touch-sensitive display. However, if the line-shaped movement is carried out on a card-like object according to the invention which has an electrically conductive structure, then the surface sensor "sees" a snapshot which is changed by the spatial configuration of the electrically conductive structure of the card-like object, that is to say typically will no longer be line-shaped, if not coincidentally all elements of the electrically conductive structure are exclusively arranged symmetrically and/or congruent to one another. Thus, the actual movement of the input means on the object and the perception of the capacitive surface sensor of this movement differ, this conversion of the card-like object being effected by the spatial arrangement of the constituents and/or elements of the electrically conductive structure and for the purposes of the invention is preferably referred to as modulation, establishment, change, distortion or shift. For the purposes of the invention, it is preferred that the movement of the input means on the card-like object is referred to as input and the perception of the surface sensor, i. e., what the surface sensor identifies from the input modulated by the object, is referred to as a time-dependent signal.

The generation of the time-dependent signal on the capacitive surface sensor is preferably carried out by the conversion of an input by the card-like object to a time-dependent signal, the time-dependent signal being preferably generated in the capacitive surface sensor. For the purposes of the invention, this wording preferably means that the time-dependent signal is generated by a relative movement between an input means and the card-like object, wherein a time-varying signal is preferably detected by the surface sensor. Since the input takes place on the card-like object and the identification takes place on the surface sensor, for the purposes of the invention, this is preferably referred to as a transmission of the signal.

Since the electrically conductive structure can be configured very flexible and, moreover, different movements of the input means are conceivable by the specification of different possibilities of movement on the card-like object, it is possible to provide a method by means of which a very high data density is retrievable by means of the card-like object. It was completely surprising that the device with an electrically conductive structure according to the present invention can have, for example, a data capacity of preferably at least 12 bits, particularly preferably at least 16 bits. It was completely surprising that this data capacity can preferably be realized on a small surface and thus leads to a high data density. In addition, the method is particularly user-friendly, since, when used, the card-like object is easily placed on the surface sensor. It is no longer necessary, as in the case of conventional data carriers and signal transmission methods between surface sensors and data carriers, to ensure that certain areas of the card-like object do not rest or rest on particular areas of the surface sensor.

The specification of different possibilities of movement of the input means on the card-shaped object opens up completely new interaction possibilities of the user with the capacitive data carrier. In a preferred embodiment of the invention, a plurality of independent electrically conductive structures are arranged on the card-like object. In one exemplary embodiment, two electrically conductive structures are arranged, each having its own operating tracks, which in this embodiment run once vertically and once horizontally. This results in a total of four directions of interaction: from top to bottom, from bottom to top, from left to right and from right to left. Each electrically conductive structure can trigger different actions on the device, which includes the capacitive surface sensor, as a function of the direction of the relative movement. It was completely surprising that a plurality of different actions can be triggered with the same card-shaped object. This represents a significant advantage over the prior art. Both in barcodes, 2D barcodes, radio tags, as well as in capacitive data carriers, which are known from the prior art, the application is essentially limited to the identification of the object. Surprisingly, the invention opens up additional opportunities for interaction.

In the context of the invention, the generation of the time-dependent signal takes place by a relative movement between an input means and the card-like object. For the purposes of the invention, this means preferably that either the input means is moved relative to the card-like object or the card-like object is moved relative to the input means or that both the input means and the object move, preferably not in the same direction and at the same speed, as this would cause a parallel movement, which is just no relative movement for the purposes of the invention. For the purposes of the invention, it is particularly preferred that the position, direction and/or speed of the relative movement influences the generation of the time-dependent signal and, in particular, determines how the time-dependent signal is formed spatially. This takes place, in particular, in cooperation with the geometric shape of the electrically conductive structure by means of which an input caused by the relative movement is converted into the time-dependent signal, and/or modulated.

For the purposes of the invention, it is preferred that the relative movement between the input means and the card-like object is preferably referred to as a second contact, which is always configured dynamically in the context of the present invention.

In a second aspect, the invention relates to a method for identifying a card-like object, comprising the following steps:

a. providing the card-like object with an electrically conductive structure comprising a plurality of individual elements,
b. placing the card-like object on a capacitive surface sensor, whereby a first contact is formed,
c. performing a relative movement between an input means and the card-like object, thereby forming a second contact,
d. generating a time-dependent signal as a function of the relative movement,
e. evaluating the time-dependent signal on the capacitive surface sensor by the device which includes the surface sensor, for identifying the card-like object wherein the time-dependent signal which is generated on the capacitive surface sensor, is established by the arrangement of the individual elements (14) on the card-like object.

The above-mentioned advantages and surprising technical effects of the method for generating the time-dependent signal also apply to the identification method. Analogously, the advantages and surprising technical effects of the identification method also apply to the method for generating the time-dependent signal. It is particularly preferred that the identification method can also be used to generate a time-dependent signal and/or the method for generating a time-dependent signal can also be used to identify a card-like object.

For the purposes of the invention, preferably, the term "identification" means that a card-like object is identified by the surface sensor and, for example, can be associated with a data record stored in the electrical device which includes the surface sensor. In this case, for example, the data record may not be directly stored in the electrical device, rather it can be accessible for said device, for example, by being retrievable on a server, on the Internet and/or in a cloud. The identification of the card-like object by the surface sensor takes place in particular by the identification of the electrically conductive structure which is arranged on the card-like object. This electrically conductive structure is determined in particular by the individual elements, which preferably in their entirety form the electrically conductive structure. It is preferred that the identification method is carried out with a card-like object which constitutes another aspect of the present invention and will be described later in detail. However, it may also be preferred to carry out the method with another object as long as it has an electrically conductive structure with individual elements.

The card-like object is placed on the surface sensor, whereby a first contact is formed. For the purposes of the invention, it is particularly preferred that a first contact is formed between the surface sensor and the card-like object. In a further configuration of the invention, which relates both to the method for generating the time-dependent signal, as well as to the identification method, the invention comprises a second contact, which is preferably formed between the card-like object and the input means. For the purposes of the invention, it is preferred that these contacts are also referred to as active contacts. For the purposes of the invention, it is therefore preferred that the method comprises the provision of a first contact and a second contact, wherein the first contact exists between the card-like object and the capacitive surface sensor and the second contact is formed between the card-like object and the input means, wherein at least the second contact is formed dynamically.

For the purposes of the invention, it is particularly preferred that the card-like object is placed on the surface sensor, wherein the card-like object is touched by an input means, whereby preferably the second contact is produced for the purposes of the invention. Preferably, the input means and the surface sensor do not touch each other, that is to say there is preferably no direct physical contact between the input means and the surface sensor. However, there is preferably a spatial relationship between the input means and the surface sensor in that a relative movement between the input means and the surface sensor can be detected or not. For the purposes of the present invention, it is particularly preferred that both the first contact and the second contact are present simultaneously.

In the following, two particularly preferred configurations of the invention will be described in terms of the contacts and the spatial relationships between the three elements 1) card-like object, 2) surface sensor and 3) input means. In a first preferred embodiment of the invention, the first contact, which preferably exists between the card-like object and the surface sensor, is formed to be stationary, the second contact, which preferably exists between the input means and the card-like object, is formed dynamically, and the spatial relationship between the input means and the surface sensor is dynamic. In this case, the card-like object can be arranged and/or placed on the surface sensor, for example, without the object being moved while the input means is moved on the card-like object. As a result, it is inherent that the input means also moves relative to the non-moving surface sensor, and therefore the spatial relationship between the surface sensor and the input means in the context of this preferred embodiment of the invention is preferably described as dynamic.

In a second preferred embodiment of the invention, the first contact, which preferably exists between the card-like object and the surface sensor, is formed dynamically, the second contact, which preferably exists between the input means and the card-like object, is also dynamic, and the spatial relationship between the input means and the surface sensor is formed to be stationary. In this preferred embodiment of the invention, the card-like object can be arranged and/or placed, for example, on the surface sensor. In addition, in this preferred embodiment, the input means is placed on the card-like object and the object is "pulled through" under the input means. As a result, the input means does not move with respect to the surface sensor, that is to say there is no relative movement between the input means and the surface sensor, and the input means and the surface sensor are arranged spatially stationary relative to one another. On the other hand, the input means and the card-like object as well as the card-like object and the surface sensor move relative to one another, which is advantageously achieved by the pull-away or pull-through movement of the card-like object.

Preferably, both embodiments have in common that the second contact between the card-like object and the input means is always formed dynamically.

If the contact between the card-like object and the input means, which is referred to as second contact for the purposes of the invention, is configured dynamically, the movement of the input means may be, but not limited to, for example, a sliding, wiping, brushing, pulling or pushing movement. For the purposes of the invention, it may also be preferred that at least one area on the card-like object is optically marked or haptically highlighted, which is adapted for the touching and/or contacting by an input means. A haptic highlighting can be achieved, for example, by applying a lacquer which is preferably applied in places to the electrically conductive structure, in particular the input area, and marks there the locations of the electrically conductive structure that are to be touched with the input means to generate the dynamic input. Tests have shown that a finger used as an input means can be guided particularly well with a lacquer marking over the input area of the electrically conductive structure by being placed in an initial area on the lacquered area of the electrically conductive structure and then follows the lacquered area. In this case it has proven to be particularly advantageous if the lacquered area is formed in a line-shaped manner and has a preferred width in the order of magnitude of a human finger. In addition, the haptic highlighting can also be achieved by print processing methods such as, for example, grooves, embossing and/or folding, whereby preferably three-dimensional leader lines are generated, which illustrate the input area to the user.

In the event that the card-like object is moved relative to the input means, it may be, for example, a pull-away or a pull-through movement in which, for example, a finger as input means is loosely placed on the object which is arranged on a surface sensor, and the object, for example, is pulled away between the input means and surface sensor and/or removed with a jerk.

For the purposes of the invention, it is preferred that the time-dependent signal is generated by a relative movement between an input means and the card-like object. In particular, as the input means and the card-like object move relative to one another, a relative movement is effected between the input means and the electrically conductive structure on the card-like object, so that preferably at least one individual element of the electrically conductive structure is contacted by the input means, thereby advantageously being "activated", that is to say becoming "visible" to the surface sensor.

This becoming visible is based on a coupling between the capacitive surface sensor and the electrically conductive structure when, for example, a grounding of the electrically conductive structure takes place, for example, by touching the structure or an element of the structure by an input means. If an input means touches the individual elements of the electrically conductive structure, there may be a charge carrier exchange between the input means and the structure. For the purposes of the invention, this preferably leads to a change of the electrostatic field between the electrodes in a surface sensor and/or to a measurable change in the capacitance. The change of the electrostatic field can be effected, for example, by contacting the surface sensor with a card-like object, whereby, for the purposes of the invention, a first contact is formed, wherein the card-like object is simultaneously in contact with an input means, whereby, for the purposes of the invention, a second contact is formed. For the purposes of the invention, it is therefore preferred that the first contact and the second contact exist simultaneously and the card-like object is arranged between the surface sensor and the input means. For the purposes of the present invention, it is particularly preferred that at least the second contact is formed dynamically. In the context of the present invention, the dynamic formation of the second contact between card-like object and input means causes the signal between the electrodes in the surface sensor to be changed. In general, the signal is reduced because the input means receives part of the signal from the transmitting electrode and thus a lower signal reaches the receiving electrode. For the purposes of the invention, it is particularly preferred that the individual elements of the electrically conductive structure with respect to size, spacing and shape are formed such that the time-dependent signal resulting from the relative movement on the capacitive surface sensor can be changed relative to a reference input by the input means which takes place without use of the card-like object.

If, for example, the input means moves over the electrically conductive structure of the card-like object and thus, for the purposes of the invention, preferably generates a dynamic second contact, the individual elements which jointly form the electrically conductive structure and are preferably referred to as individual elements are initiated one after the other that is to say, for example, activated one after the other. It may, for example, be preferred that at least one or two or more individual elements are touched jointly and/or simultaneously by the input means, whereby a time-varying signal is generated on the surface sensor, which reflects the spatial arrangement of the "touched" individual elements on the card-like object.

In this case, the time-dependent signal which is detected by the surface sensor is not formed solely by the movement of the input means relative to the card-like object, but in particular also by the arrangement of the individual elements of the electrically conductive structure on the card-like object. For the purposes of the invention, it is particularly preferred that the relative movement of the card-like object and the input means is converted into another differently shaped and running time-varying signal by the spatial configuration of the electrically conductive structure, by the signal detected by the surface sensor being distorted by the outer shape of the electrically conductive structure.

If, in a preferred embodiment, an electrically conductive structure consists of identical strips of the same length, and the input means slides in a rectilinear line-shaped movement over the center of these strips, which are preferably arranged next to one another at the same height, then the surface sensor will detect a signal which essentially corresponds to said rectilinear line-shaped movement and reflects the same. A central arrangement of a line-shaped individual element characterized this way, is preferably referred to as zero position for the purposes of the invention. The signal thus obtained can be displayed for example on the display of the surface sensor. It is preferably referred to as a time-dependent signal, since it preferably corresponds to a path-time diagram in physics, with which the spatial course of a movement as a function of time can be represented. For the purposes of the invention, it is preferred that there is essentially no preferred spatial distortion of the signal when all, for example, line-shaped individual elements of the electrically conductive structure are present in the zero position. In a preferred embodiment of the invention, it is theoretically possible to construct a virtual center line which preferably runs centrally through the individual elements and essentially corresponds to a center of gravity line of a charge carrier distribution within the electrically conductive structure.

In a preferred configuration of the invention, the individual elements of the electrically conductive structure are essentially formed by rectangles which are essentially arranged in parallel to one another. If the electrically conductive structure is formed by strips arranged in parallel, it is preferred for the purposes of the invention for the imaginary center line to be essentially perpendicular to the outer edges of the outer strips of the electrically conductive structure.

However, if some or all of the strips are shifted relative to the zero position, that is to say they are no longer arranged centrally around the imaginary center line, there may be a preferably spatial distortion of the time-dependent signal that is detected by the surface sensor. If, for example, a greater proportion of a line-shaped individual element is arranged on a side A of an imaginary center line of the electrically conductive structure corresponding to the zero position, the time-dependent signal is shifted in said direction A, which is, for example, referred to as modulation, distortion or change for the purposes of the invention. For the purposes of the invention, it is preferred that the degree of distortion depends on how strongly an individual element is shifted relative to the zero position. An individual element which deviates greatly from the zero position preferably leads to a strong distortion of the time-dependent signal, while a weak deviation from the zero position preferably leads to a weak distortion.

If the input means is simultaneously in contact with a plurality of individual elements of the electrically conductive structure, the distortion effects of the individual elements advantageously superimpose in the generation of the time-dependent signal, so that the generated time-dependent signal reflects the spatial shape of the electrically conductive structure which can be detected by the surface sensor by the relative movement of the card-like object and the input means. The conversion and/or modulation of the relative movement to a time-dependent signal on the surface sensor preferably takes place before the evaluation of the signal by the device which includes the surface sensor, whereby advantageously an identification of the card-like object can be achieved. For this purpose, for example, the detected time-dependent signal or its spatial course can be compared with data (sets) from a database which is either stored on the electronic device which includes the surface sensor or which is accessible to it in another way.

If, in a further preferred embodiment, the electrically conductive structure consists of line-shaped elements of equal length but different width, and these line-shaped elements are centrally arranged with respect to their length on the card-like object and arranged at variable distances from each other and the rectilinear line-shaped movement takes place centrally on the card-shaped object, the resulting time-dependent signal on the capacitive surface sensor can be described as follows: the spatial course of the signal is essentially characterized by an approximately constant x-coordinate and a time-dependent change of the y-coordinate essentially corresponding to the relative movement. Thus, there is essentially no or only a slight spatial distortion of the signal. However, the resulting time-dependent signal will preferably have a specific speed profile relative to the reference input. The input means gradually comes into operative contact with the electrically conductive elements on the card-like object when moving across the card-like object, i. e., the input means gradually covers the electrically conductive elements. When the input means reaches an electrically conductive individual element, the position of the resulting signal is suddenly shifted in the direction of the individual element at this time.

In a specific example, the input means is moved along an imaginary straight line in the y-direction at a uniform speed on the card-like object. As long as the input means does not come into contact with electrically conductive elements, the resulting time-dependent signal is preferably essentially characterized by touches, which essentially differ by the time stamp and the respective y-coordinate, the speed of the touches being essentially constant. When the input means reaches an electrically conductive individual element, at that time the position of the resulting signal is suddenly shifted in the direction of the individual element, i. e. the single touch is shifted much more strongly with respect to the y-coordinate compared to the previous touches. Using the parameters of the individual touches of the resulting time-dependent signal, a speed profile can be calculated. For the purposes of the invention it is preferred that fluctuations in the speed profile can preferably be identified when the input means comes into contact with electrically conductive individual elements.

The term "essentially" is not unclear to the person skilled in the art, because the person skilled in the art knows that an electrically conductive structure which is formed "essentially by rectangles" predominantly consists of individual elements which are of rectangular design, wherein the structure may also comprise a few individual elements that are not of rectangular design. These non-rectangular individual elements can have any conceivable shape, for example triangular, elliptical, oval, round, floral-shaped, star-shaped, rhomboid or a freeform shape. The term "essentially parallel" is understood by the person skilled in the art to mean that the individual elements of the electrically conductive structure are applied in parallel within the scope of the application accuracy. If the individual elements are printed, for example, the individual elements are printed within the scope of the printing accuracy, which may, for example, result in deviations from the parallelism in the order of magnitude from 0 to 2°.

In a preferred embodiment of the invention, it is provided that the individual elements of the electrically conductive structure with respect to size, spacing and shape are formed so that the time-dependent signal resulting from the relative movement between the input means and the card-like object on the capacitive surface sensor is changed with respect to a reference signal which is established by a reference input with the input means which takes place without using the card-like object.

In another aspect, the invention relates to a card-like object, the card-like object having an electrically conductive structure comprising a plurality of individual elements arranged on the card-like object. For the purposes of the invention, it is particularly preferred that the card-like object is adapted to carry out the methods described above, or to carry out the methods described above with the card-like object. In a preferred configuration of the invention, the individual elements of the electrically conductive structure have a width of 0.1 mm to 20 mm and a spacing of 0.1 mm to 30 mm. For the purposes of the invention, it is most preferred to use electrically conductive structures with a width of not more than 6 mm, that is, for example, electrically conductive structures with a preferred width of 0.1 to 6 mm, all values between 0.1 and 6 mm being preferred for the purposes of the invention. This dimensional order preferably represents the limit for conductive structures, which must not be undercut, so that the surface sensor can distinguish a stand-alone electrically conductive structure from another electrically conductive structure. A particular merit of the present invention is therefore that of providing methods and systems with which an electrically conductive structure can induce a signal on a surface sensor, although the individual elements of the structure, if they were arranged alone on a data carrier, could not be identified by the surface sensor, because individually and taken in isolation they would be too small to be resolved and/or detected by the surface sensor. As a result, the present invention differs significantly from the electrically conductive structures described in the prior art, the components of which are usually deliberately larger than, for example, 8 mm, in order to be reliably identified by the surface sensor. The design of electrically conductive structures whose components can be individually identified even by a surface sensor is often referred to in the prior art as "imitation of fingertips", which is not intended with the present invention.

As a result of these deliberately selected dimensions of the individual elements, it is advantageously achieved that the electrically conductive structure is adapted such that the input generated by means of a relative movement between the input means and the card-like object can be converted to a time-dependent signal, that is, modulated to one by deliberately exposing the signal to distortions that are advantageously caused by the individual elements of the conductive structure. The individual elements of the electrically conductive structure are in particular configured such that a single individual element which is not in operative contact with an input means cannot be detected and/or identified by a surface sensor.

It was completely surprising that an electrically conductive structure can be provided whose individual components, i. e., the individual elements without operative contact with an input means, do not generate a signal on the capacitive surface sensor, wherein the elements in their entirety as an electrically conductive structure are surprisingly adapted to effect, for example, a deflection of a signal on the surface sensor. The generation of the time-dependent signal, which may be changed relative to a reference input of an input means without a card-like object, is advantageously effected by the synergistic interaction of the individual elements, which in their entirety constitute the electrically conductive structure of the card-like object. It represents a departure from the prior art to provide an electrically conductive structure for the identification by a surface sensor, whose individual elements can not or only partially be detected by a surface sensor. A person skilled in the art has hitherto assumed that an electrically conductive structure which is to be readout or detected by a surface sensor must consist of elements which simulate the properties of fingertips and which individually and taken in isolation can also be detected by the surface sensor.

In this respect, in a further aspect, the invention relates to the use of the card-like object for generating a time-dependent signal on a capacitive surface sensor by a relative movement between the input means and the card-like object. The above-mentioned advantages and surprising technical effects of the method for generating the time-dependent signal and the identification method also apply to the card-like object and its use. Similarly, the advantages and surprising technical effects of the card-like object and its use also apply to the identification method and the signal generation method. This applies in particular to the preferred embodiment of the invention, according to which the generation of the time-dependent signal on the capacitive surface sensor comprises the provision of a first contact and a second contact, wherein there is a first contact between the card-like object and the capacitive surface sensor, and a second contact between the card-like object and the input means, wherein the first contact and the second contact exist simultaneously, and at least the second contact is formed dynamically.

In this respect, the present invention differs from conventional data carriers, in which information can be extracted from the individual elements, preferably in that in the context of the present invention, a time-dependent signal is generated by the movement of an input means with respect to a card-like object, wherein the time-dependent signal can be detected and evaluated by the surface sensor. In comparison, systems are described in the prior art, in which there is a movement between the data carrier and a reading device.

For the purposes of the invention, it is particularly preferred that the individual elements of the electrically conductive structure of a card-like object with respect to size, spacing and shape are formed so that a time-dependent signal resulting from a relative movement between an input means and the card-like object on a capacitive surface sensor is changed relative to a reference input with the input means, which takes place without using the card-like object.

For the purposes of the invention, it is particularly preferred that the individual elements of the electrically conductive structure with respect to size, spacing and shape are dimensioned so that at least two individual elements are at least partially in operative contact with the input means at any point in time of the relative movement. The input means may be, for example, a finger or a conductive object. In this case, the at least two individual elements can be oriented identically or differently with respect to the imaginary center line of the electrically conductive structure, wherein different orientations of the individual elements preferably lead to different distortion effects on the time-dependent signal, while identical orientations preferably lead to essentially equal distortion effects. In the case of different distortion effects, these effects may superimpose, so that the signal generated preferably reflects the spatial structure of the electrically conductive structure, in particular the arrangement of the individual elements on the planar card-like object.

In a further preferred configuration of the invention, the individual elements of the electrically conductive structure with respect to size, spacing and shape are dimensioned so that at any time of the relative movement at most one individual element is in operative contact with a finger or a conductive object. Due to the increased spacings between the individual elements, the generated time-dependent signal is preferably returned to the zero position. For the evaluation of the signal, this type of arrangement allows a particularly simple and unambiguous identification of the relative movement by the input means and thus preferably a more accurate determination of the signal pattern. Another advantage of this embodiment is the avoidance of superimpositions of the distortion effects by a plurality of individual elements and the resulting unambiguity in the evaluation of the signal in the electronic device, which includes the surface sensor.

It is further preferred that the input takes place with an input means such as, for example, one or more fingers or an electrically conductive object, preferably in a movement relative to the card-like object, while the card-like object is not moved relative to the capacitive surface sensor. For other applications, it may be preferred that the input takes place with an input means, for example, one or more fingers or an electrically conductive object, in a movement relative to the card-like object, while the finger is not moved relative to the capacitive surface sensor, and the card-like object is moved between input means and capacitive surface sensor.

The time-dependent signal may preferably be described by the x and y coordinates as well as by timestamp information. The spatial course of the time-dependent signal may, for example, be undulating, continuous, along a line and/or up and down, without being limited thereto. In this case, it is preferred that the spatial course essentially follows the structure and/or arrangement of the individual elements. If the electrically conductive structure consists of rectangular line-shaped individual elements which are arranged essentially in parallel next to one another, for example like a zebra crossing, the shorter sides of the strips form an outer line of the electrically conductive structure which is interrupted by the gaps between the strips. This may be, like a zebra crossing, a straight line if all the individual elements have the same start position and/or end position. If all the individual elements also have the same length, the result is preferably a rectangular electrically conductive structure with essentially parallel outer lines.

If the rectangular strips forming the individual elements do not have the same start and end position and/or have different lengths, the outer lines can be configured, for example, in an undulated fashion.

For the purposes of the invention, it is preferred that the time-dependent signal generated particularly reflects the course of these outer lines, or their superimposition, wherein the spatial course of the time-dependent signal can be made visible, for example, on a display of the surface sensor. It may be preferred for some applications of the invention that the course of the time-dependent signal is not deflected in sections and follows the movement of the input means on the card-like object. Such applications are, for example, card-like objects that have multiple areas of the electrically conductive structure. For example, each area is associated with a different action on the electronic device. It is preferred that the time-dependent signal for unambiguous identification of the individual areas between the individual areas is not deflected in sections. By means of such sections without interruption, the absolute position of the respective section on the card-like object can advantageously also be determined.

For the purposes of the invention, it is particularly preferred that the simultaneous operative contacts between input means and card-like object and card-like object and surface sensor are formed in a capacitive fashion. It may also be preferred that the operative contact between the input means and card-like object constitutes a galvanic connection. A capacitive operative contact has the advantage that no galvanic connection has to exist between the input means and the electrically conductive structure, that is to say the electrically conductive structure can be covered, for example, by means of a lacquer, a color layer, a printed graphic, a label or sticker and/or or another layer. This makes it possible to optically cover the electrically conductive layer and to make the surface of the card-like object appealing independently of the conductive structure. In addition, the electrically conductive layer can advantageously be protected from mechanical abrasion and a more reliable function can be ensured during prolonged use. This represents a clear advantage over the prior art, since the electrically conductive structure as an identification feature of the respective card-shaped object can preferably be hidden completely optically and haptically. In the prior art, for example, barcodes are known which are readout optically by means of a camera or photosensor, and are therefore inherently visible and can affect the external appearance of a product. In addition, RFID tags are known in the prior art, which consist essentially of an antenna and an applied chip. These tags can also be integrated into thinner and/or flexible materials, but the chip is often noticeable because it has a certain minimum thickness.

In addition, the electrically conductive structure can be applied to a preferably flexible substrate material of the card-like object by means of a foil transfer method, for example cold foil transfer, hot stamping and/or thermal transfer, without being limited to these application methods. In particular, printing methods such as offset printing, gravure printing, flexographic printing and/or screen printing and/or inkjet methods using electrically conductive inks which are based, for example, on metal particles, nanoparticles, carbon, graphene and/or electrically conductive polymers, can be used for the production of the card-like object, without being limited to these printing methods and/or materials. For the purposes of the invention, it may also be preferred to cover the electrically conductive structure with at least one further layer, wherein this layer may be a paper-based or foil-based laminate material or at least a lacquer/ink layer. This layer may be optically transparent or opaque.

It was completely surprising that the electrically conductive structure can be particularly easily individualized due to its preferred structure of essentially similar individual elements.

A feature of classical conventional printing methods is the simple and rapid reproduction of a motif in that the motif to be printed is applied on a printing form, such as gravure cylinder or offset printing plate, and reproduced multiple times and at high speed. Conventional printing methods are not suitable for producing individualized content, since the printing form production represents a significant proportion of the total production costs. Thus, only larger volumes of a printed product can be produced economically. In graphic printing, digital printing methods exist for the production of low volumes as well as individualized products with which individual contents can be printed economically. These printing methods comprise, for example, electrophotography, laser printing or inkjet printing. At the present time, it is not possible to produce electrically conductive elements economically using such digital printing methods. However, it is possible to produce individualized electrical conductive structures by means of combinations of methods of conventional printing methods and additive or subtractive methods. In the following two possible production processes are outlined.

Laser Ablation:

In the first step, an electrically conductive basic structure is applied to a, for example, flexible substrate by means of electrically conductive paint or by a foil transfer method. The basic structure consists for example of uniform equidistant individual elements, for example, rectangles. In a second process step, the electrically conductive individual elements are galvanically separated from one another at certain locations by laser ablation, that is to say at these locations the electrically conductive material is selectively removed. This allows to produce unique, i. e. individualized, structures efficiently. A surprising advantage of this production method is the good optical concealability of the electrically conductive structure. Even after overprinting or covering the electrically conductive structure by means of laminate or label, the electrically conductive structure may optionally be visible to the human eye under backlight conditions. If the structure is distributed over the entire surface and only separated at certain locations by a thin laser cut, this structure is much more difficult to identify with the naked eye.

Accordingly, in a further preferred configuration, the invention relates to a card-like object, wherein the electrically conductive structure is produced in a multistage process comprising the following steps:
 a) applying an electrically conductive basic structure to a substrate by means of a foil transfer method or an electrically conductive paint,
 b) selectively removing parts of the electrically conductive basic structure by means of a laser, whereby an electrically conductive structure is obtained with individual elements having spatially separated areas.

In a further preferred embodiment, the invention relates to a card-like object, wherein the electrically conductive structure can be produced in a multistage process, wherein the multistage process preferably comprises the following steps:

a) providing an electrically conductive substrate material, for example metal foils or metal plates, metallized paper and/or aluminum-coated foil,
 b) selectively removing parts of the electrically conductive coating by means of a laser, whereby an electrically conductive structure with individual elements is obtained, having spatially separated areas.

For the purposes of the invention, the term "by means of a laser" preferably means that laser radiation is used in order to ablate electrically conductive material at selected locations of the electrically conductive basic structure that has been applied previously. As a result, interruptions form in the previously continuously electrically conductive individual elements of the basic structure, which advantageously interrupt a galvanic connection between two sub-areas of an individual element, whereby, for example, the length of an individual element can be adjusted. As a result, an electrically conductive structure with individual elements can be produced, wherein the individual elements of the electrically conductive structure have spatially separated areas. Advantageously, the area of an individual element can also be set, which can be detected by the surface sensor in the event of a relative movement between input means and card-like object. For the purposes of the invention, it is preferred that the substrate is designed to be flexible. For example, it may be a plastic, cardboard and/or paper card of such thin design that it is flexible and particularly easy to process within a printing press, i. e., can be printed. It is particularly preferred that such a card is in a preferred size range of a visit or check card.

Inkjet Printing:

Another possibility for retrospective individualization of the electrically conductive structure is the retrospective application of electrically conductive bridges. In the first step, an electrically conductive basic structure is applied to, for example, a flexible substrate by means of electrically conductive paint or by a foil transfer method. The basic structure preferably consists of equidistant individual elements, for example, rectangles, which have interruptions at certain locations. In a second process step, these interruptions are selectively printed by means of electrically conductive paint and thus interconnected. Also with this process, unique, i. e. individualized, electrically conductive structures can be produced efficiently.

Accordingly, in a further preferred configuration, the invention relates to a card-like object, the electrically conductive structure being produced in a multistage process comprising the following steps:
 a) applying an electrically conductive basic structure to a substrate by means of a foil transfer method or an electrically conductive paint,
 b) selectively applying electrically conductive bridges and/or additional electrically conductive elements by means of inkjet printing by means of which electrically conductive paint is applied to the card-like object, whereby an electrically conductive structure with individual elements is obtained.

In this preferred embodiment of the invention, the term "substrate" is preferably understood as in the previously described configuration of the invention. In the present embodiment of the invention, it is particularly preferred that the electrically conductive basic structure comprises individual elements which have interruptions. For the purposes of the invention, these interruptions are preferably gaps within an individual element, wherein each individual element preferably has one or more interruptions. It is particularly preferred that these interruptions interrupt a galvanic connection within the respective individual element. For the purposes of the invention, an electrically conductive bridge is preferably an electrically conductive object that overcomes an interruption in the sense that it establishes an electrical connection between the areas of an individual element previously separated by an interruption. Such an electrically conductive bridge is generated by applying electrically conductive paint to the card-like object by means of inkjet printing, whereby an electrically conductive structure having individual elements is advantageously obtained, in which interruptions of the previously applied basic structure are overcome by the bridges and a previously non-existent connection between two sub-areas of an individual element can be produced. The newly created connection can be capacitive as well as galvanic. For the purposes of the invention, it may also be preferred that electrically conductive bridges and/or additional electrically conductive elements are applied to the card-like object using other applicators.

In a further embodiment, the electrically conductive basic structure comprises individual elements. It is preferred that these individual elements are extended by inkjet printing in one or both directions by printing additional electrically conductive material adjacent to and superimposing the respective individual element by at least 0.2 mm. By applying such additional electrically conductive elements, the electrically conductive basic structure can be changed in a particularly uncomplicated manner.

For the purposes of the invention, it is preferred to refer to the retrospective processing of initially generated electrically conductive basic structures as "individualizing". This preferably means that card-like objects can be generated, each having a different electrically conductive structure, wherein this difference can be preferably identified by a surface sensor, so that, for example, different data(sets) and/or actions can be assigned to the different card-like objects in an electronic device having a surface sensor. It was completely surprising that these post-processing processes made it possible to individualize card-like objects in a particularly fast, cost-effective and simple manner, which was previously impossible to do by an economical method.

In a further aspect, the invention relates to a system comprising a card-like object and a capacitive surface sensor, wherein the card-like object can be placed on the capacitive surface sensor, and the card-like object is adapted to generate a time-dependent signal by a relative movement between an input means and the card-like object, wherein the time-dependent signal can be established by an arrangement of the individual elements on the card-like object. The definitions, technical effects and advantages described with regard to the method and the card-like object apply analogously to the system, and vice versa. In this embodiment of the invention, it is particularly preferred that the individual elements of the electrically conductive structure with respect to size, spacing and shape are formed such that the time-dependent signal resulting from the relative movement between the input device and the card-like object on the capacitive surface sensor is changed relative to a reference input with the input means, which takes place without using the card-like object.

For the purposes of the invention, it is particularly preferred that the system is characterized by a first contact and a second contact, the first contact existing between the card-like object and the capacitive surface sensor, and the second contact existing between the card-like object and an input means, wherein at least the second contact is formed dynamically. For the purposes of the invention, it is preferred that the dynamic formation of the second contact corresponds to the relative movement between the input means and the card-like object.

Figure 19:
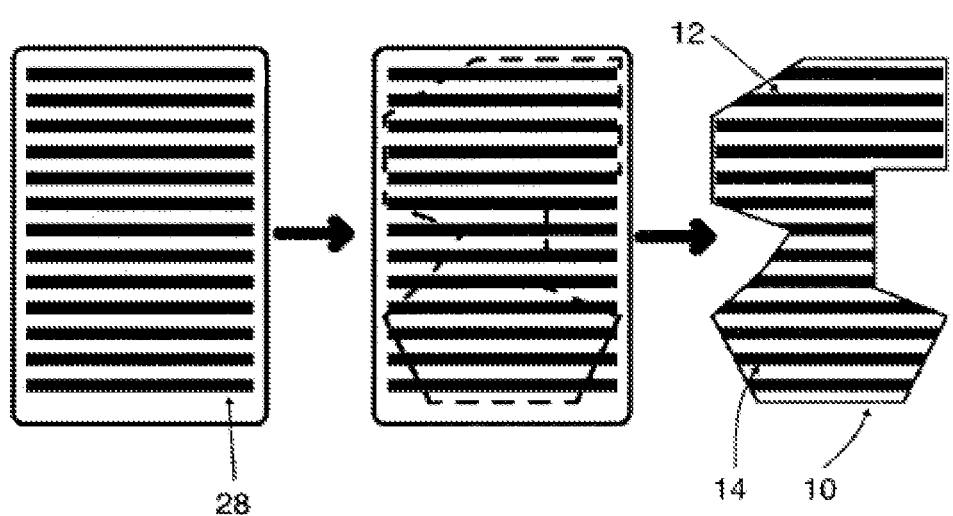

Structuring the Individual Elements by Changing the Outer Shape, Such as Punching The flexible arrangement of the individual elements results in a further embodiment of the invention in which, surprisingly, the respectively required size, spacing and shape of the individual elements can be produced particularly economically in existing production methods as an alternative or in addition to the printing process. Thus, it is conceivable to produce an already existing electrically conductive structure or surface by means of punching, cutting, laser cutting and/or tearing, for example, along a defined perforated line, so that the individual elements can generate the time-dependent signal according to the invention. Thus, it is also possible to retrospectively and cost-effectively structure already existing conductive materials such as, inter alia, metallized foils or holograms to form the individual elements of this invention. A corresponding embodiment of the invention is shown in FIG. 19.

Arrangement and Configuration of the Individual Elements as an Optical Design or to Enable Other Functions, for Example by Combining Functions A particular advantage of the invention results surprisingly from the extremely flexible size, spacing and shape of the individual elements. Thus, these electrically conductive individual elements can also be visible to the user and arranged, for example, in the form of certain symbols, signs or designs. One possible application may be, for example, a company logo consisting of conductive individual elements on marketing material and/or a safety feature, such as a hologram, consisting of individual elements according to the invention, on a banknote. Particularly for safety-relevant applications, available materials for holograms, which are applied, for example, by electrically conductive aluminum in the foil transfer method, can be used to produce the individual elements according to the invention. The big advantage here is that the resulting signal is detected capacitively and no direct galvanic contact is necessary. Surprisingly, it is also possible to use materials which, for example in the case of holograms, are covered by means of foils or lacquers to protect against mechanical abrasion. Furthermore, the individual elements can also be arranged according to other electronic functionalities and thus be formed, for example, as an antenna or conducting tracks.

Figure 20:
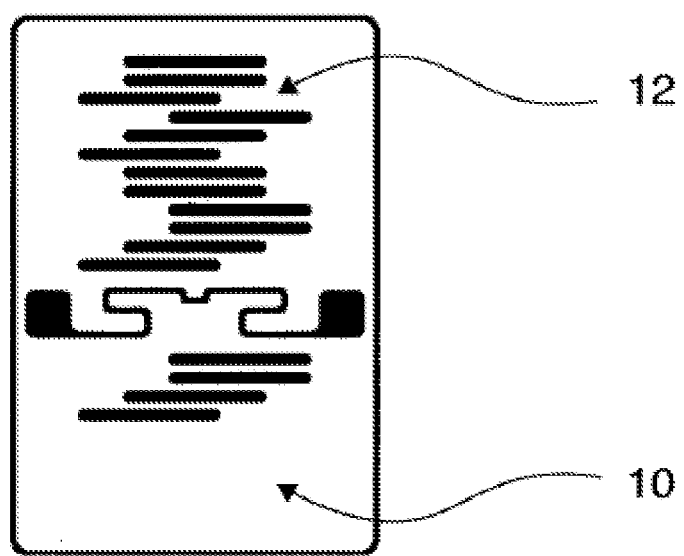

For the purposes of this invention, it was completely surprising that in production numerous efficiency gains and cost savings are possible by the individual elements for generating the time-dependent signal according to the invention being able to simultaneously fulfill other functions. Conversely, for the purposes of the invention, it may also be preferable to capacitively evaluate existing holograms or other safety elements individually or in combination with an additionally applied electrically conductive structure, or retrospectively to modify them, for example by means of a laser or inkjet, to generate a specific resulting signal on the surface sensor, which can be evaluated. In the prior art, only separate functions by means of conductive structures have hitherto been known, but not such a combination of favorable properties as here. One possible application may be, for example, a combination of an RFID or NFC tag and this device in a plastic card, the RFID/NFC tag preferably being used for identification, and the device enabling preferably an additional identification of interactions on a capacitive surface sensor, such as, for example, a tablet. A corresponding embodiment of the invention is shown in FIG. 20.

Combination of Materials with Different Electrical Properties

Figure 21:
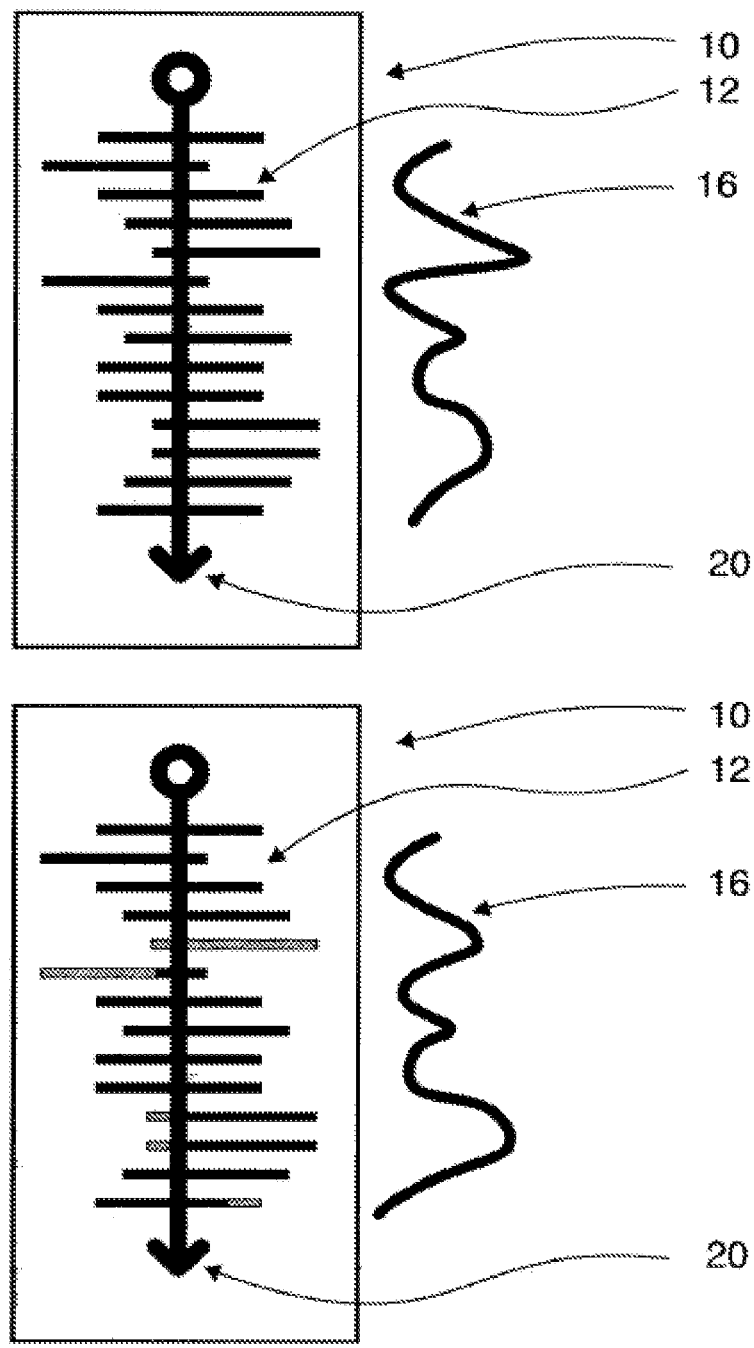

Another surprising advantage of the invention results from the combination of materials of different conductivity. Generating one or more of the individual conductive elements of a card-like object completely, partially and/or mixed from materials having different electrical properties results in a different modulation of the time-dependent signal compared to such conductive individual elements produced all of the same conductive material. This is of great advantage, in particular for safety-relevant applications, such as banknotes, identity documents, payment functions and/or identification functions, since it is no longer possible to deduce the modulation of the time-dependent signal from the visible electrically conductive structure. FIG. 21 shows, in comparison, two optically identical conductive structures and their signal course, wherein in one structure some individual elements have been produced wholly or partly from a material having different electrical properties.

Conductive Structures as Non-Functional Confusion Patterns

Figure 22:
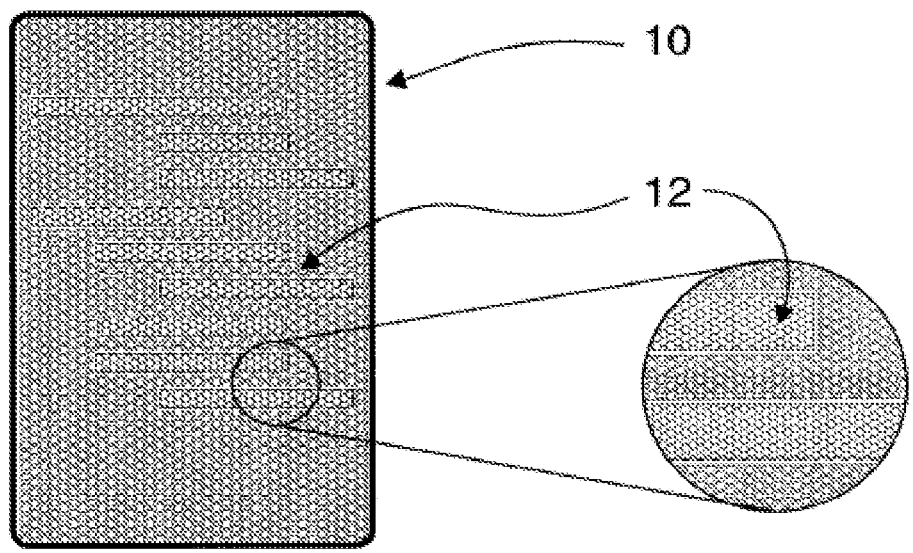

FIG. 22 shows a card-like object with an electrically conductive structure, in which, in addition, a further conductive structure, galvanically separated from the first structure, is applied as an optical confusion pattern. It proves to be a surprising advantage according to the invention that the conductive individual elements as well as an optical confusion structure can consist of the same material without impacting the functionality. Since the actual structure of the invention is thus optically harder to identify, a possible application may be, for example, in the area of banknotes and/or identification cards and/or copy protection.

Figure 23:
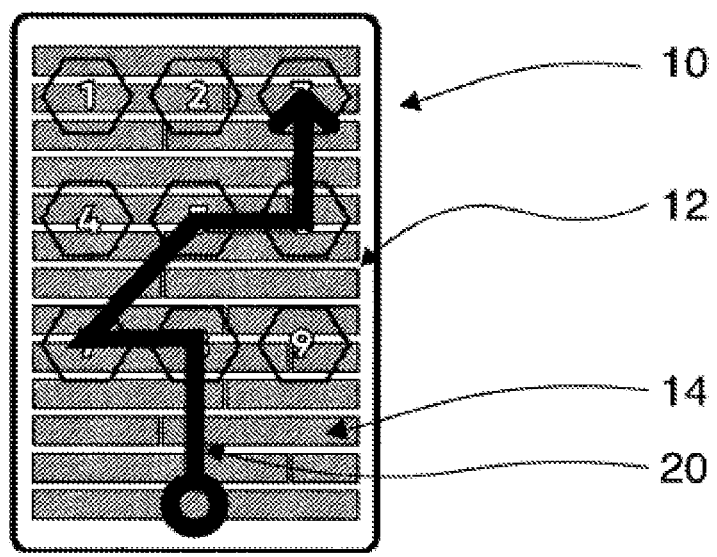

Individual Movement Paths to Generate Different Signals with the Same Conductive Structure FIG. 23 shows a card-like object on which an electrically conductive structure is arranged, which has markings for a possible operating path. The input preferably takes place by means of a relative movement of the input means between two or more of these markings. Depending on the user-selected operating path, a different time-dependent signal is generated. One possible application may be, for example, entering a password via a carrier medium such as an ID card and/or payment card based on an individually selected gesture. For the purposes of the invention, it was particularly surprising that such a gesture, as is known, for example, for unlocking smartphones, in combination with an easy to implement card-shaped object in the sense of a two-factor authentication, for example, can serve as an additional individual key.

Arranging Individual Elements Around an Object

Figure 24:
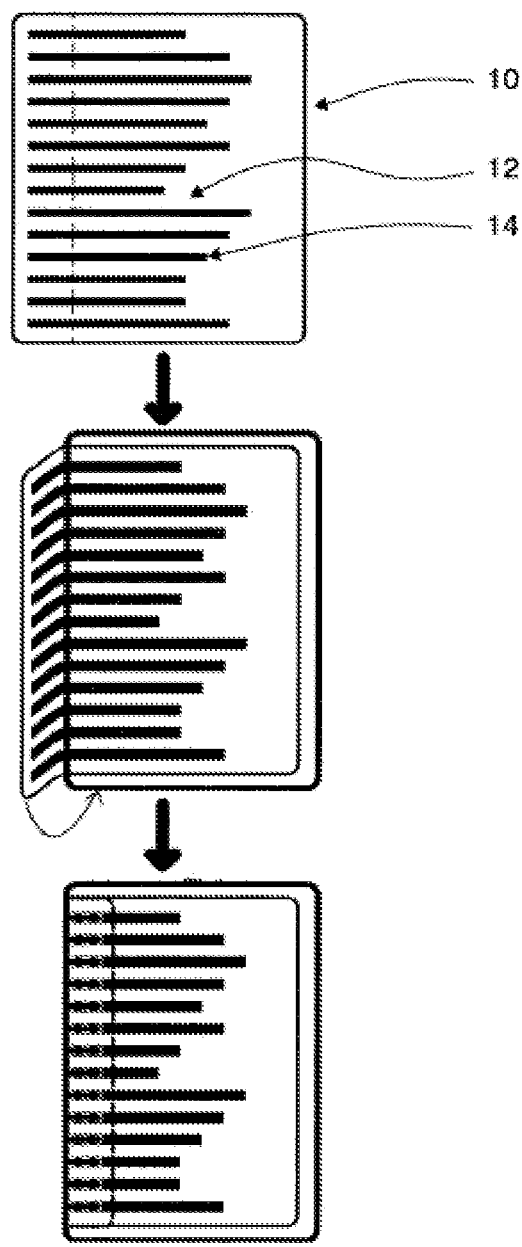

FIG. 24 shows a card-like object having an electrically conductive structure that has been wrapped around another object at least partially. In this case, the electrically conductive structure was configured such that the first active contact and the second active contact each take place on two different sides or planes of the wrapped object. A possible application may be, for example, the identification of identity documents and/or particularly thick substrates and/or packages by means of a retrospectively applied identification label.

Generation of the Conductive Structures by Means of a Pen With Electrically Conductive Paint Suitable materials are electrically conductive inks, which are applied by means of a pen, e. g., based on carbon, graphite, CNTs, electrically conductive polymers, metal particles or other materials that are suitable for the application of an electrically conductive film.

Simpler Determination of the Signal Path

In a further preferred configuration of the invention, the individual elements of the electrically conductive structure at the start and at the end of the relative movement are configured specifically with regard to size, spacing and shape. The special configuration results in a defined signal at the start and at the end of the signal path and thus a simpler determination of the signal path when evaluating the signal. Likewise, these specifically configured individual elements can be repeated periodically to obtain in this way a clock signal, which in turn simplifies the evaluation of the signal. A possible exemplary embodiment has wider individual elements at the start and/or the end of the electrically conductive structure. For the purposes of the invention, this means preferably that the individual elements at the start and/or the end of the electrically conductive structure are configured wider than the individual elements of the electrically conductive structure, which are arranged in the center of the electrically conductive structure.

Flexible Arrangement of the Individual Elements

Figure 25:
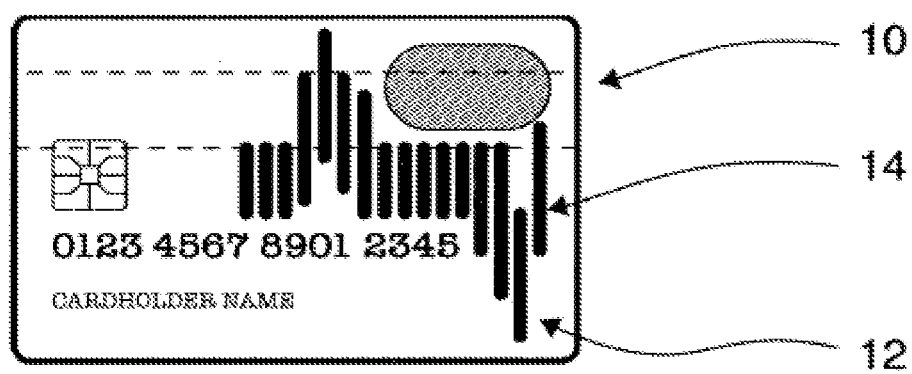

FIG. 25 shows a multilayer card structure in the form of a plastic card, in which the conductive structure is arranged within the card. Due to the flexibility in the arrangement of the individual elements, it is in particular surprisingly possible to arrange the individual elements around other electronic or electrically conductive components, so that they cannot exert any disturbing influence. This results, for example, in a possible application in the coding of a credit card and/or check number and/or supplementary passwords for identity documents. FIG. 25 shows a credit card in which the individual elements have been arranged between the chip and, for example, the hologram of the credit card.

Input Means as Part of the Surface Sensor

In a further aspect, the invention relates to the use of the card-like object for generating a time-dependent signal on a capacitive surface sensor by a relative movement between the card-like object and the capacitive surface sensor, wherein the input means maintains a fixed position relative to the capacitive surface sensor, and/or the Input means is part of the surface sensor.

Use of Particularly Thin Substrates

In an embodiment of the invention comprising particularly thin substrates, it was particularly surprising that due to the contact of the three elements 1) card-like object, 2) surface sensor, and 3) input means, also thin substrates can be used for the card-like object. These substrates may preferably have special low-level grammages and may be particularly thin.

In the prior art, only static input patterns are known that generate a footprint at a particular time. Therefore, in prior art devices and systems, it is imperative that the static input pattern be fully in contact with the surface sensor at all times. Since the relative movement of the input means according to the invention keeps the electrically conductive structure always in contact with the surface sensor, this clear limitation in the prior art is solved and any kind of substrate can be used, regardless of thickness, bends, kinks, and/or wrinkles. A possible application for particularly thin substrates in the range 10-90 g/m$^2$ may be, for example, banknotes, documents, labels, magazines, books, bottle labels, thin foils and/or peelable labels. The person of ordinary skill in the art knows the thicknesses of such products.

Figure 2:
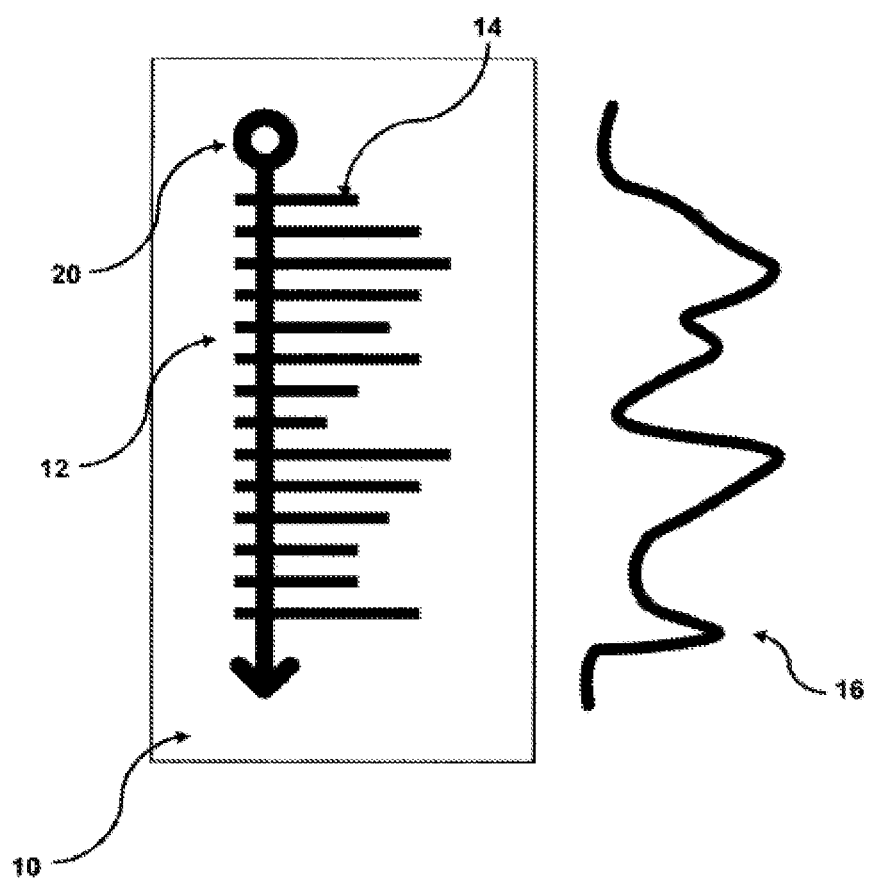
Figure 3:
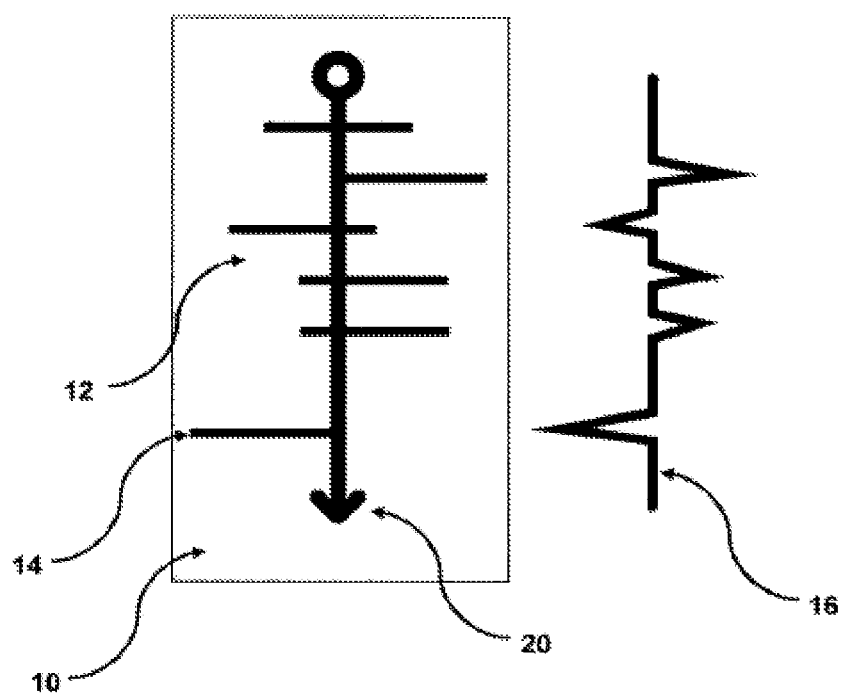
Figure 14:
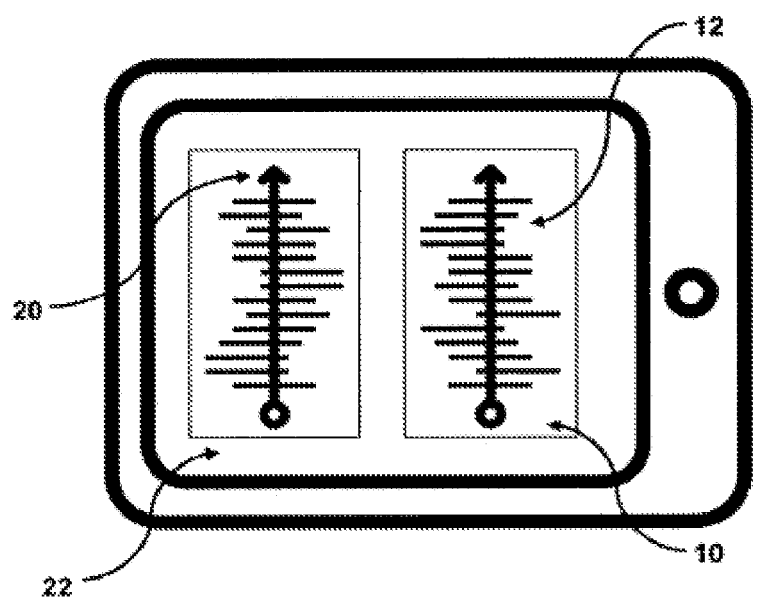
Figure 15:
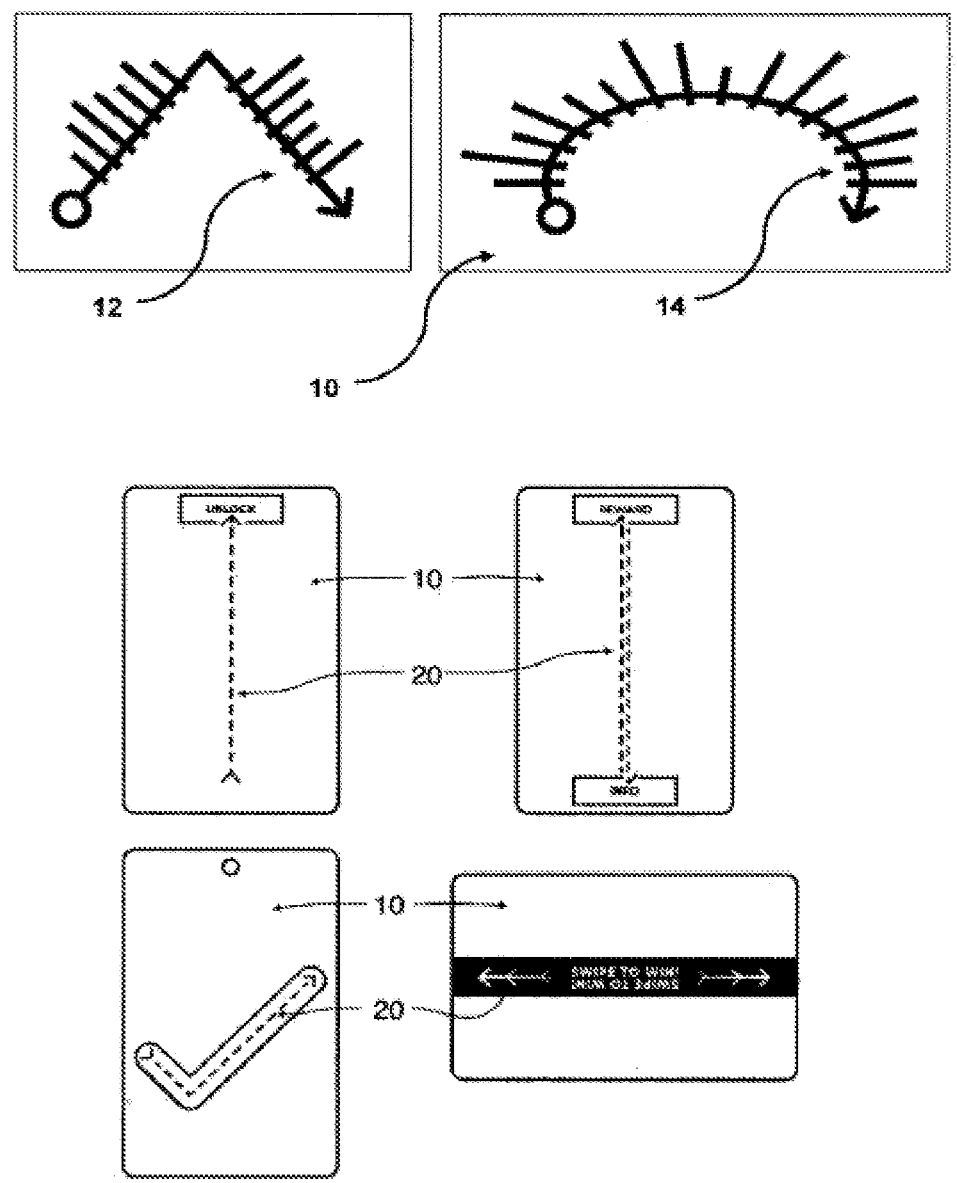
Figure 16:
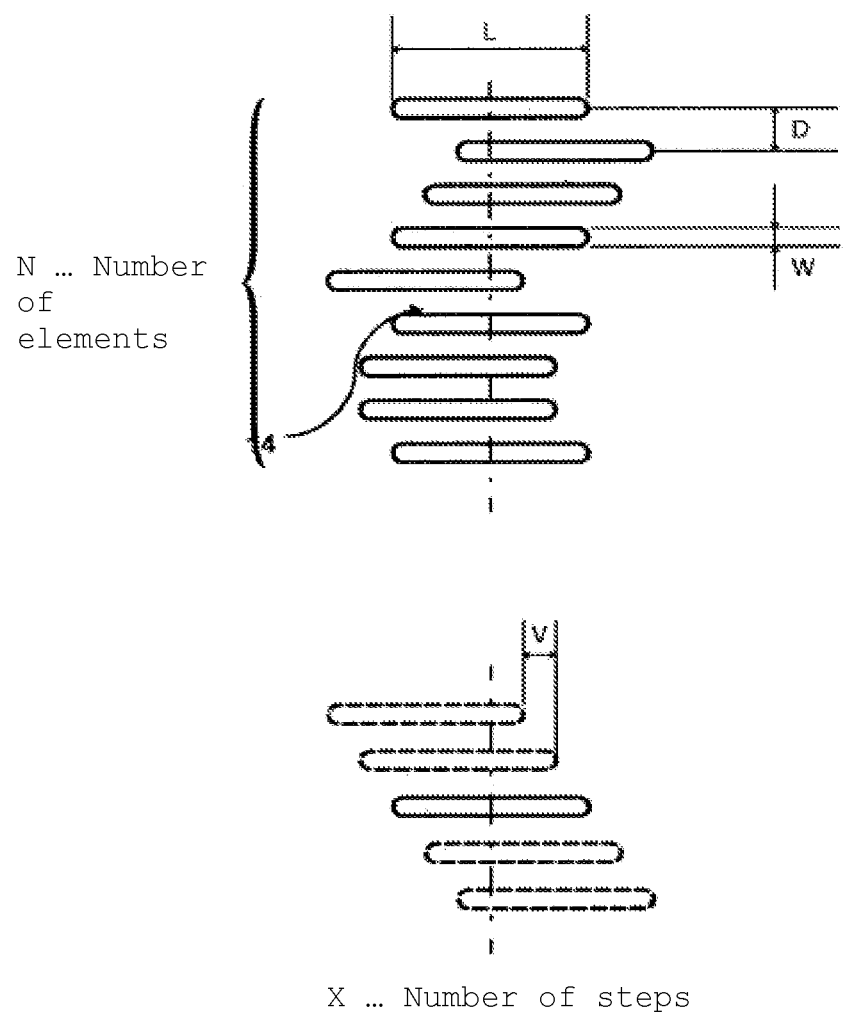
Figure 17:
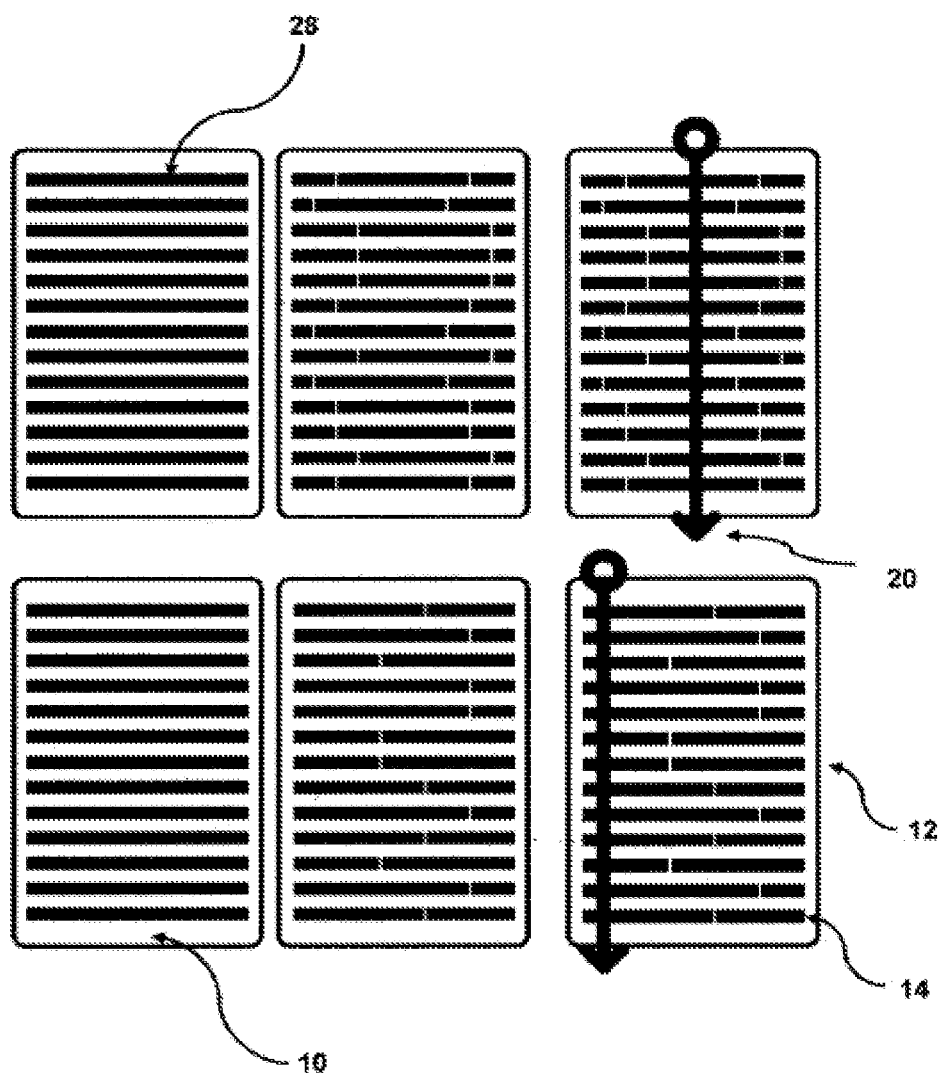
Figure 18:
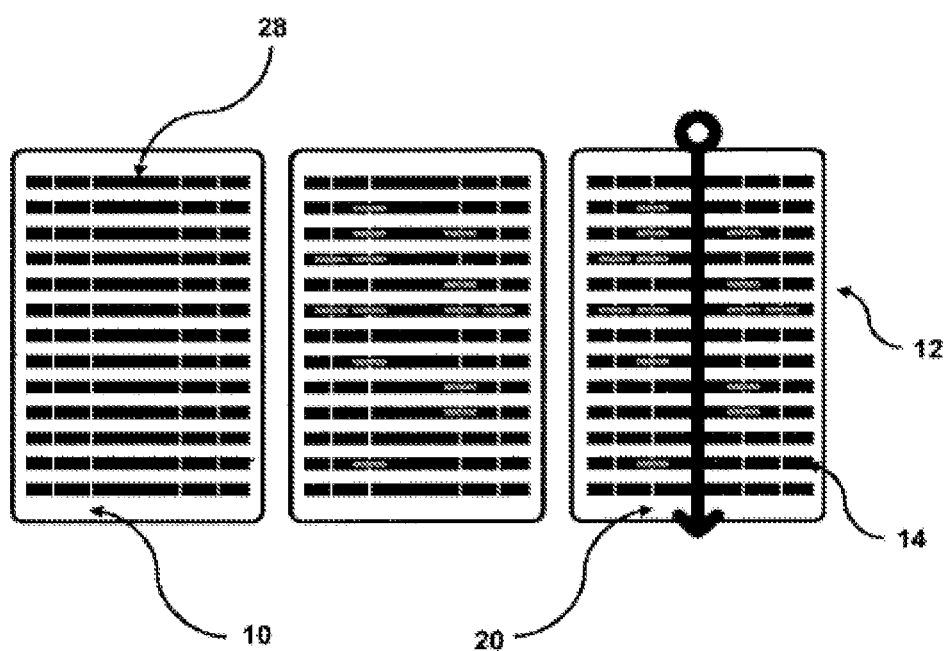

The invention will be described in more detail with reference to the following figures:

FIGS. 1 to 3 various preferred design variants for a preferred embodiment of the electrically conductive structure FIGS. 4 to 15 possible uses of various preferred embodiments of the invention FIG. 16 a preferred embodiment of the electrically conductive structure FIGS. 17 and 18 exemplary methods for individualizing a card-like object FIGS. 19 to 27 further preferred embodiments of the invention FIG. 1 shows a card-like object (10), which rests on a capacitive surface sensor (22) and has an electrically conductive structure (12) comprising a plurality of individual elements (14). By a relative movement (20, represented by an arrow) of the input means (18) on the card-like object (10), a time-dependent signal (16) is generated on the capacitive surface sensor (22), wherein the time-dependent signal (16) is established by the arrangement of the individual elements (14).

FIGS. 1 to 3 show various design variants for the electrically conductive structure (12) of a preferred embodiment of the card-like object (10). The preferred embodiments illustrated in FIGS. 1 to 3 each have strip-shaped individual elements (14) arranged parallel to one another, which differ in particular with regard to the position of an "operating track" and the variance of the length of the individual elements (14). For the purposes of the invention, the term "operating track" preferably designates the path-shaped area of the conductive structure (12) to be touched by an input means (18), either by a movement of the card-like object (10) or by a movement of an input means (18), wherein preferably both ways of movement cause a relative movement (20) of the input means (18) to the object (10). FIGS. 1 to 3 each show a possible graphical representation of the spatial profile of the time-dependent signal (16).

FIG. 1 shows a card-like object (10) with an electrically conductive structure (12) which is characterized by equally long, equidistant individual elements (14). The intended "operating track" for the relative movement (20) between the input means (18) and the card-like object (10) is located in the center of the electrically conductive structure (12). The resulting time-dependent signal (16) is produced in this preferred configuration of the invention preferably on both sides of the operating track.

In this preferred embodiment of the electrically conductive structure (12), the profile of the time-varying signal (16) represents a superimposition of the signals which go back to the components of the individual elements (14) which are arranged both to the right and to the left of the operating track. This preferably is the case because the strip-shaped individual elements (4) have no common start and end position and are statistically distributed with respect to the operating track. For the purposes of the invention, this means preferably that a larger proportion of some individual elements (14) are present on the right side and a larger proportion of other individual elements (14) are present on the left side of the operating track. The time-dependent signal (16) is preferably composed of the total signals of all individual elements (14), wherein in each case the location and position of the entire individual element with respect to the operating track is taken into account in the generation of the time-dependent signal (16) or in the evaluation of this signal (16) for identifying a card-like object (10).

It can clearly be seen that this course in FIG. 2 reflects the course of the outer line of the electrically conductive structure (12), that is to say of the undulating outer shape on the right side of the electrically conductive structure (12) on the card-like object (10). In the preferred embodiment of the electrically conductive structure (12) shown in FIG. 2, the concept of amplitude modulation is advantageously implemented in which the length of the individual elements (14) is directly related to the signal path.

The spatial course of the time-dependent signal (16) in the case of FIG. 2 corresponds in particular to the course of the outer line of the electrically conductive structure (12), since the strip-shaped individual elements (14) occupy a uniform start position on the left side of the figure that the left outer line of the electrically conductive structure (12) in FIG. 2 is formed by a rectilinear strip-shaped outer line. The arrow in the figures marks the course of a relative movement (20), which is preferably carried out by guiding or moving an input means (18) over an electrically conductive structure (12). Preferably, the circle marks the start point of the movement and the arrowhead marks a possible end of the movement, as well as the direction in which the movement of the input means (18) takes place, without being limited thereto. FIG. 2 also shows that the spatial course of the time-varying signal (16) represents a superimposition of the individual signals that each individual element (14) of the electrically conductive structure (12) causes on the surface sensor. The degree of this superimposition can advantageously be set in the evaluation of the signal detected by the surface sensor (22) and is therefore variable. In particular, it also depends on the spacing of the individual elements (14) of the electrically conductive structure (12), as well as on the size of the input means (18).

FIG. 2 shows, in particular, a card-like object (10) with an electrically conductive structure (12), which is characterized by equidistantly arranged individual elements (14) of different lengths. The intended "operating track" for the relative movement (20) between input means (18) and card-like object (10) is located off-center at the edge of the electrically conductive structure (12). The resulting time-dependent signal (16) is formed in this preferred configuration of the invention, preferably adjacent to the operating track.

FIG. 3 shows a card-like object (10) with an electrically conductive structure (12) which is characterized by individual elements (14) of equal length, which are not arranged at the same spacing. The intended "operating track" for the relative movement (20) between input means (18) and card-like object (10) is located in the center of the electrically conductive structure (12). The resulting time-dependent signal (16) is produced in this preferred configuration of the invention preferably on both sides of the operating track. Due to the increased spacing between the individual elements (14), the time-dependent signal (16) is always returned to the zero position. In this preferred arrangement of the individual elements (14), a particularly simple identification of the operating track, for example by an evaluation software, can be made possible in particular. In this preferred embodiment of the invention, the concepts of amplitude and frequency modulation are preferably combined. The amplitude of the resulting signal (16) preferably results from the lengths of the individual elements (14). The frequency of the signal (16) preferably results from the spacing between the individual elements (14). Of course, it is also possible to combine the preferred embodiments of the electrically conductive structures (12) shown in FIGS. 1 to 3.

Figure 4:
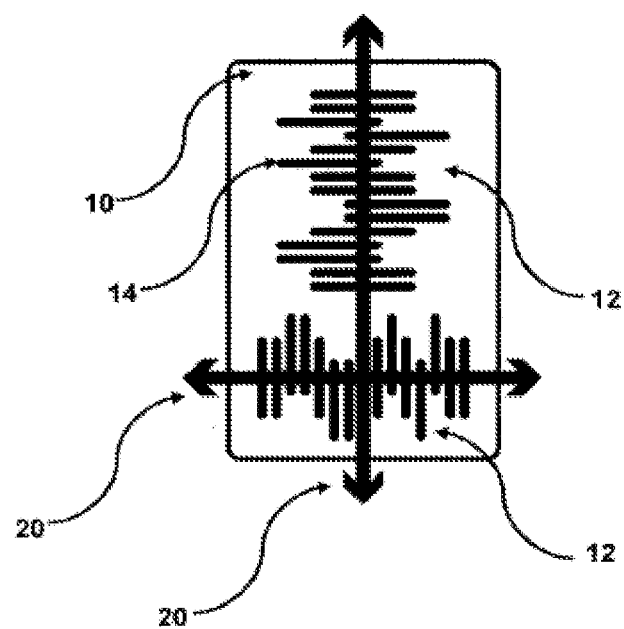

FIGS. 4 to 15 show applications of various preferred embodiments of the invention. FIG. 4 shows a card-like object (10) on which two independent electrically conductive structures (12) are arranged. These two electrically conductive structures (12) each have their own operating tracks, which in this exemplary embodiment run once vertically and once horizontally. This results in a total of four directions of interaction: from top to bottom, from bottom to top, from left to right and from right to left. Depending on the direction of the relative movement (20), each electrically conductive structure (12) may trigger different actions on the device which includes the capacitive surface sensor (20).

Figure 5:
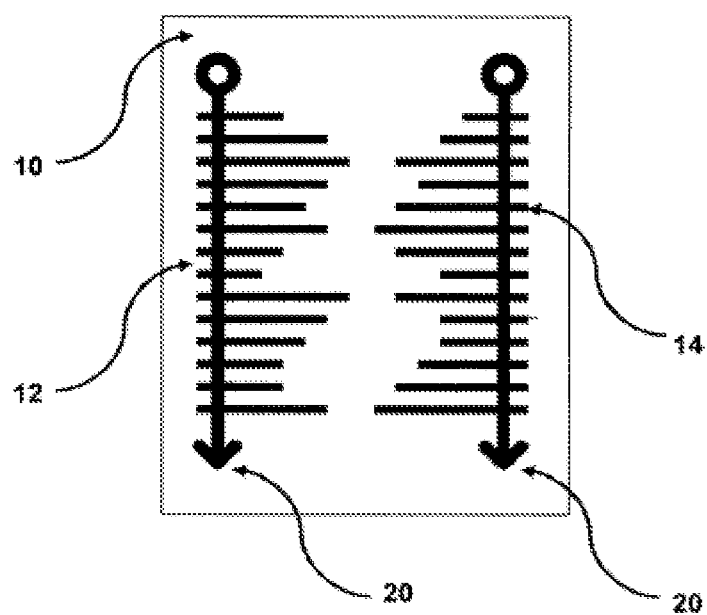

FIG. 5 also shows a card-like object (10) on which two independent electrically conductive structures (12) are arranged. These two electrically conductive structures (12) each have their own operating tracks, which are arranged at different positions on the card-like object (10). Thus, depending on the selected path of movement, a card-like object (10) may trigger different actions on the device which includes the capacitive surface sensor (20).

Figure 6:
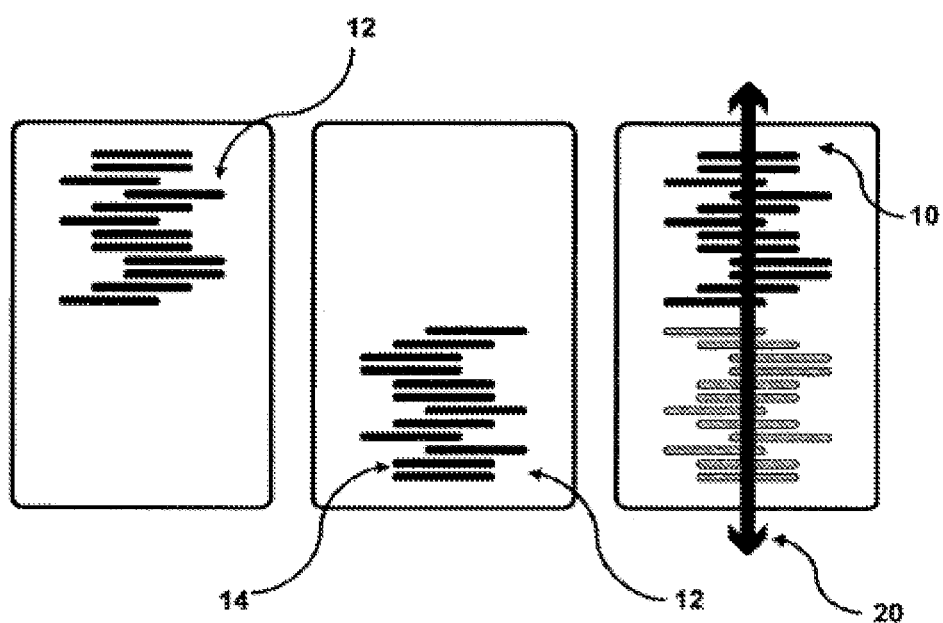

FIG. 6 shows two electrically conductive structures (12), one on the front side of the card-like object (10) (shown on the left side of the figure) and one on the back of the card-like object (10) (shown in the center of the figure). Thus, for example, as in classic card games, the same back sides of the entire the game can be combined with different front sides. Both electrically conductive structures (12) cause the generation of a composite signal (16) on the capacitive surface sensor (22) during relative movement (20) of an input means (18) along the path of movement on the card-like object (10).

Figure 7:
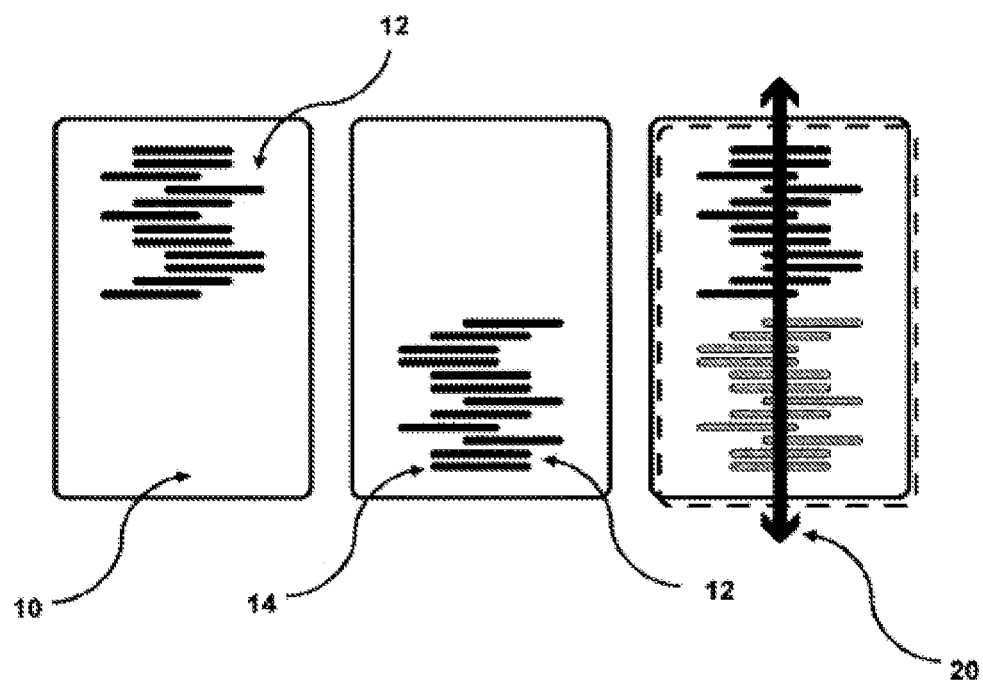

FIG. 7 shows a similar approach to FIG. 6. Here, two different electrically conductive structures (12) are arranged on two different cards (10). These are superimposed on the capacitive surface sensor (22) for readout and are in operative contact successively when the input means (18) is moved on the stack of card-like objects (10) along the path of movement relative to the cards (10).

Figure 8:
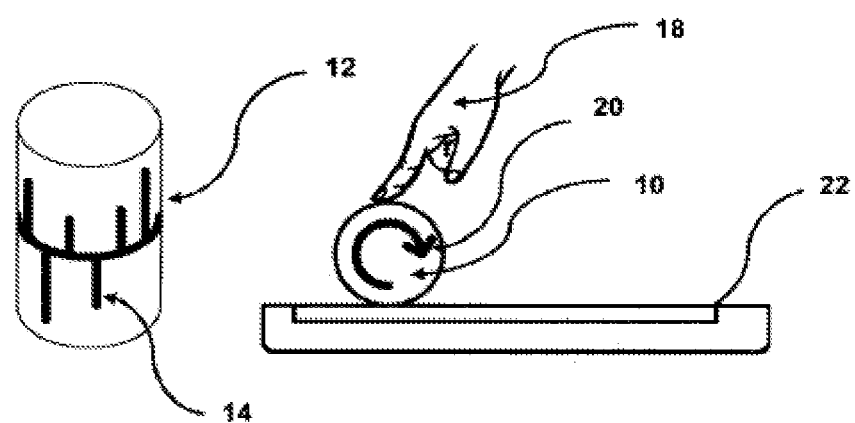

FIG. 8 shows the arrangement of the electrically conductive structure (12) on a cylinder, wherein a card-like object (10) with an electrically conductive structure (12) can be arranged, for example, on an outer side of the cylinder. The card-like object (10) may also be in the form of a sticker or label that can be attached to a preferably three-dimensional object. In this preferred embodiment of the invention, the individual elements (14) are interconnected via a circumferential main strand. The user touches the cylinder in the area of the main strand and moves the cylinder in rolling fashion over the capacitive surface sensor (22). The arrangement of the individual elements (14), which are in operative contact with the capacitive surface sensor (22) at the respective time, preferably generate a signal (16) on the capacitive surface sensor (22).

Figure 9:
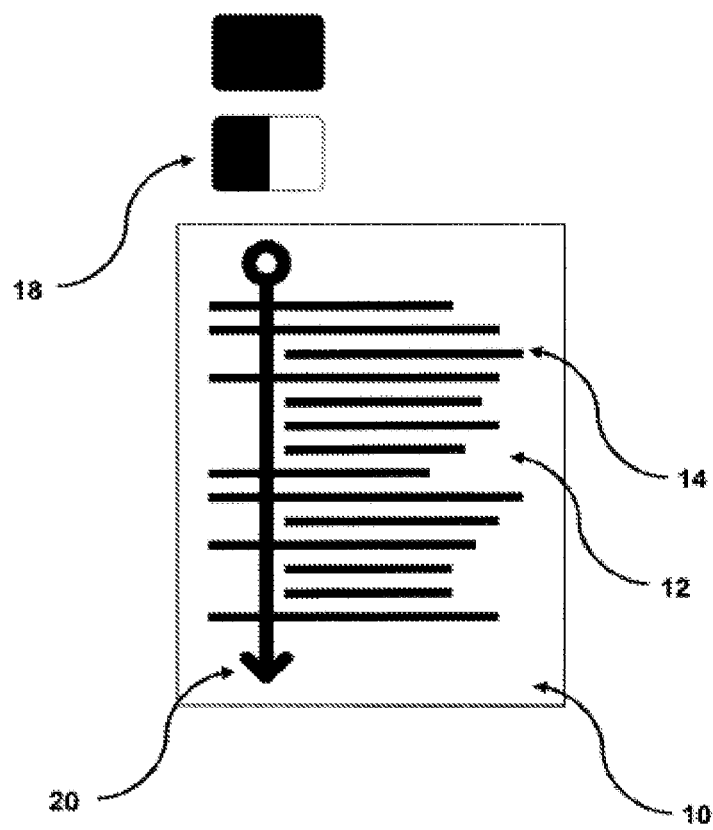

FIG. 9 shows a card-like object (10) on which an electrically conductive structure (12) having an operating track is arranged. The input preferably takes place by a relative movement (20) of the input means (18) along this operating track. In particular, two different configurations of the input means (18) are shown. Depending on the configuration of the input device (18), different signals (16) are generated on the capacitive surface sensor (22). In FIG. 9, the rectangle with rounded corners represents in each case the input means (18). The electrically conductive area is shown in black. The above-described preferred input means is formed electrically conductive over the entire surface; the input means shown below, as an example, is formed electrically conductive only on the left half. Each input means (18) thus generates a different signal during relative movement (20) via the same card-like object (10) on the capacitive surface sensor (22) and can thus trigger different actions on the device which includes the capacitive surface sensor (22). A possible application is the distinction of users, players or operators by providing various input means.

Figure 10:
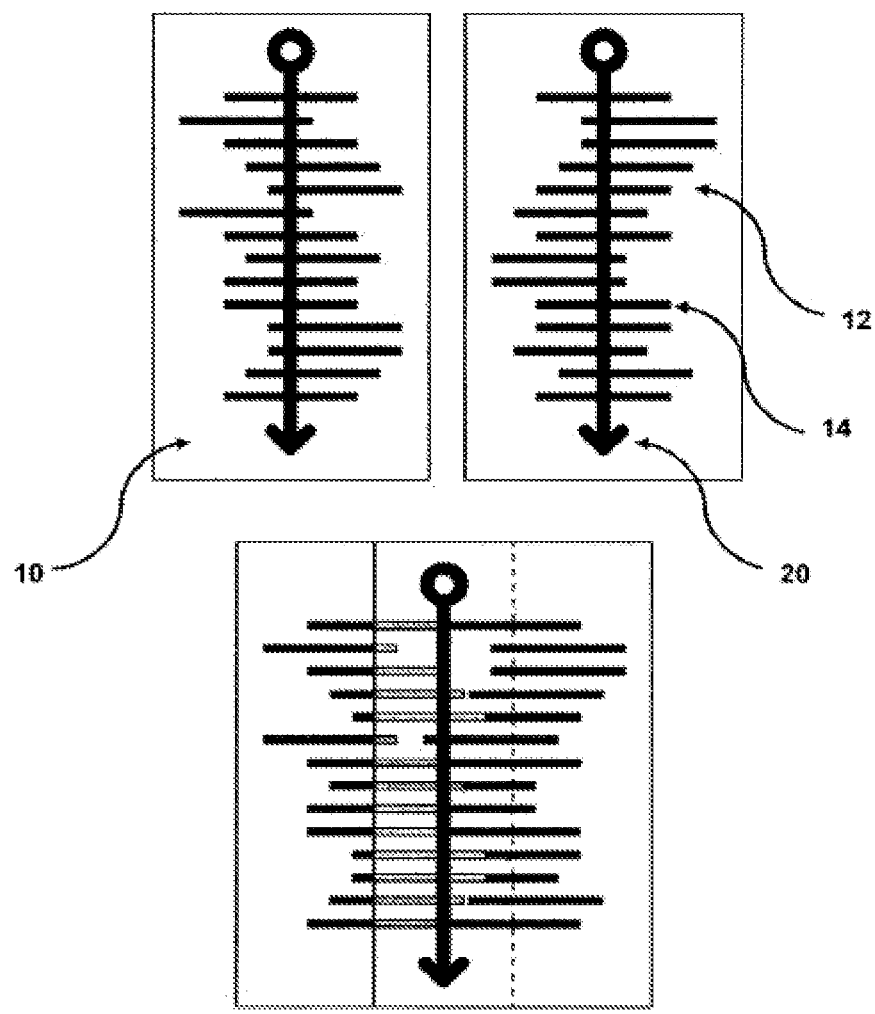

FIG. 10 shows two different card-like objects (10). In particular, the card-like objects differ in the configuration of their electrically conductive structures (12). Here, two different electrically conductive structures (12) are arranged on two different cards (10). These cards are placed on the capacitive surface sensor (22) for readout in half overlapping fashion and are thus simultaneously in operative contact with relative movement (20) of the input means (18) on the stack of card-like objects (10) along the path of movement. Each of the three electrically conductive structures (12)—that of the first card, that of the second card and that of the combination of both cards—can trigger different actions on the device which includes the capacitive surface sensor (22).

Figure 11:
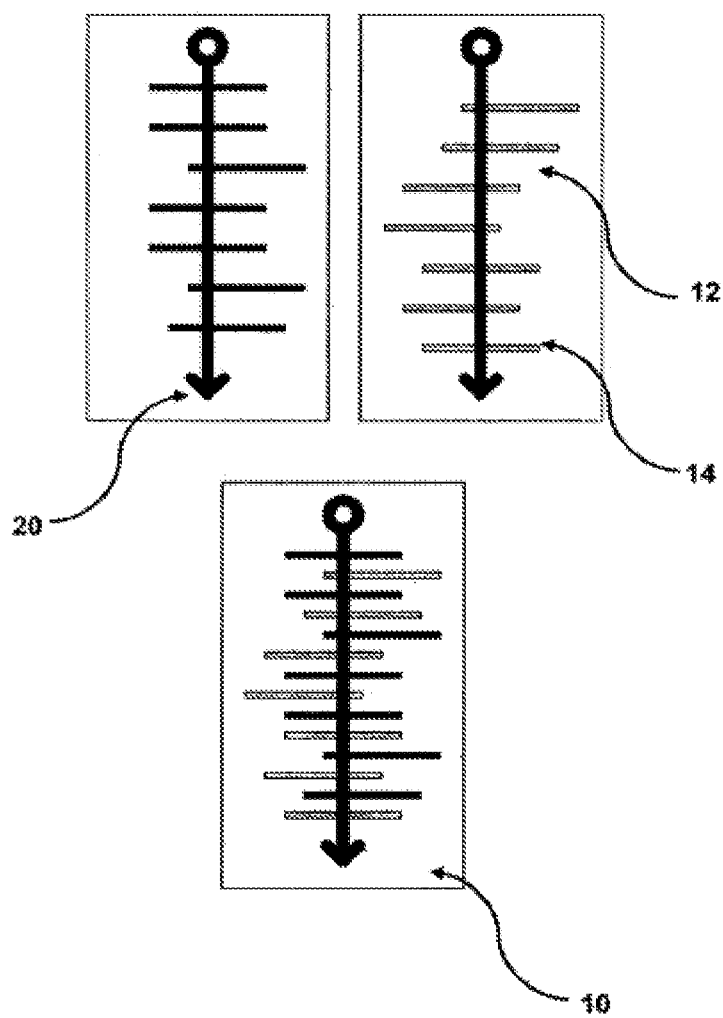

FIG. 11 shows two different card-like objects (10). In this preferred embodiment of the invention, two different electrically conductive structures (12) are arranged on two different cards (10). These cards are placed on the capacitive surface sensor (22) for readout one above the other and are therefore preferably simultaneously in operative contact with relative movement (20) of the input means (18) on the stack of card-like objects (10) along the path of movement. The electrically conductive structures (12) on the two cards (10) are offset to one another and are superimposed when the cards (10) are lying one on top of the other. Each of the three electrically conductive structures (12)—that of the first card, that of the second card and that of the combination of both cards—can trigger different actions on the device which includes the capacitive surface sensor (22).

Figure 12:
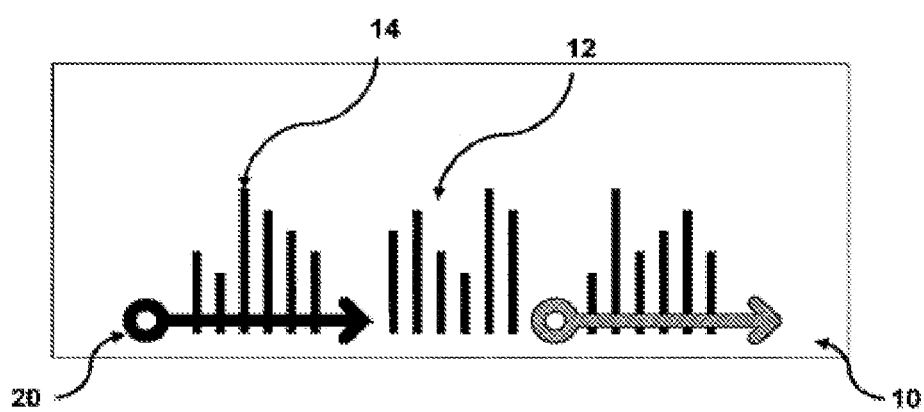

FIG. 12 shows a card-like object (10) on which a plurality of electrically conductive structures (12) are arranged. The card-like object (10) is placed on the capacitive surface sensor (22) for readout. Depending on the selected position of the movement path in relative movement (20) of the input means (18) on the card-like object (10), different actions can be triggered on the device which includes the capacitive surface sensor (22). This allows for entry of a selection. One possible application may be, for example, the selection of an answer and/or input in a game or quiz.

Figure 13:
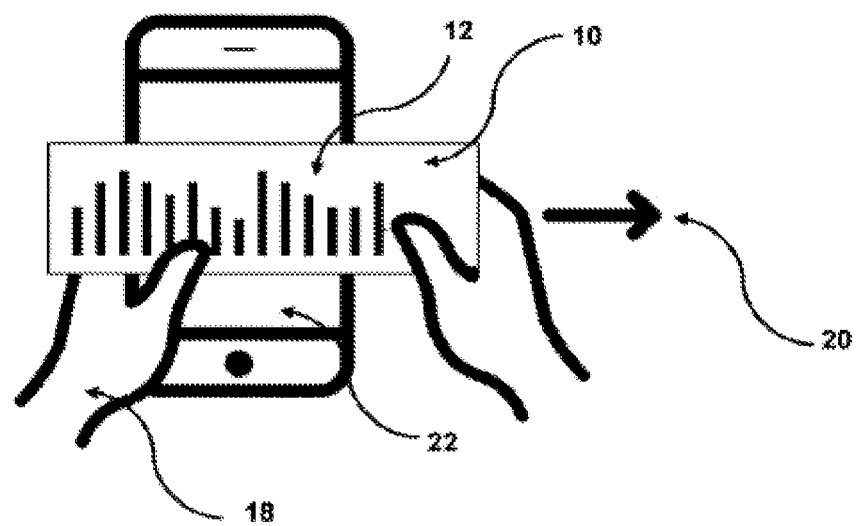

FIG. 13 shows a card-like object (10) with an electrically conductive structure (12), which is pulled over the capacitive surface sensor (22) for readout and in doing so, is touched with the input means (18), for example a human finger or another part of the hand. The card-like object in this embodiment may have a length that is significantly greater than the width of the object. By way of example, web-like objects may also be preferred, for example, which are provided wound up on rollers. In this preferred embodiment of the invention, the relative movement (20) of the input means (18) on the card-like object (10) is caused by the movement of the card-like object (10), that is to say the card-like object (10) is pulled through between the capacitive surface sensor (22) and the input means (18). The spatial course of the time-dependent signal (16) in this example does not represent an undulating line, but follows an up and down movement in the area in which the input means (18) is spatially related to the surface sensor (22).

FIG. 14 shows the simultaneous use of two card-like objects (10) with an electrically conductive structure (12) on a capacitive surface sensor (22).

FIGS. 15a and b show card-like objects (10) with an electrically conductive structure (12). Variants of movement paths or operating tracks are shown. Movement paths can run in any direction, change direction and/or be curved. The lower part of FIG. 15 shows further variants of movement paths or operating tracks, along which the input means (not shown) can be routed on the card-like object (10).

FIG. 16 shows the relationship between the design of the electrically conductive structure (12) of the card-like object (10) and the data capacity. The preferred embodiment of the card-like object (10) shown in FIG. 16 has an electrically conductive structure (12) consisting of essentially uniform individual elements (14). The shape of the individual elements (14) may be, for example, rectangular with rounded corners. The design can be characterized by the following characteristic values:

number N of individual elements (14)
width W of the individual element (14)
length L of the individual element (14)
spacing D between the individual elements (14)
arrangement of the individual elements (14) in X steps
step distance V The total width $W_{ges}$ of the electrically conductive structure (12) is $$W_{ges}=L+(X-1)*V$$

The total length $L_{ges}$ of the electrically conductive structure (12) is $$L_{ges}=(N-1)*D+W$$

This results in an area requirement $A_{ges}$ of the electrically conductive structure (12) of $$A_{ges}=W_{ges} \times L_{ges}$$

The theoretical data capacity C is calculated according to $$C=X^N$$

The resulting data density $C_A$ (data capacity per area) is $$C_A = \frac{C}{A_{ges}}$$

The following table gives an overview of specific exemplary embodiments. These examples are based on outer dimensions of card-like objects (10), for example business cards, playing cards, etc., and are applicable to any other formats.

| Example | N | W/mm | L/mm | D/mm | X | V/mm | W_ges/mm | L_ges/mm | A_ges/mm2 | C |
|---|---|---|---|---|---|---|---|---|---|---|
| 1 | 9 | 5 | 40 | 7 | 3 | 10 | 60 | 61 | 3.660 | 19,683 |
| 2 | 10 | 2 | 30 | 6 | 3 | 10 | 50 | 56 | 2.800 | 59,049 |
| 3 | 9 | 3 | 30 | 7 | 5 | 5 | 50 | 59 | 2.950 | 1,953,125 |
| 4 | 10 | 3 | 30 | 7 | 5 | 5 | 50 | 66 | 3.300 | 9,765,625 |
| 5 | 16 | 2 | 30 | 5 | 5 | 5 | 50 | 77 | 3.850 | 152,587,890,625 |
| 6 | 12 | 2 | variable | 6 | 4 | 5 | 40 | 68 | 2.720 | 16,777,216 |

For reliable evaluation of the signal (16) on the capacitive surface sensor (22), it may be advantageous, for example, always to arrange the first and last individual element (14) in the zero position. Then the theoretical data capacity C is calculated as follows:

$$c=X^{(N-2)}$$

For example 3, the results are as follows:

| Example | N | W/mm | L/mm | D/mm | X | V/mm | W_ges/mm | L_ges/mm | A_ges/mm2 | C |
|---|---|---|---|---|---|---|---|---|---|---|
| 3A | 9 | 3 | 30 | 7 | 5 | 5 | 50 | 59 | 2.950 | 78.125 |

These theoretical values are gross values. The user data may be smaller by implementing checksums, redundancy, or error detection and/or correction algorithms.

FIG. 17 shows by way of example how an electrically conductive structure (12) for the purposes of the present invention can be applied to a card-like object (10). In this case, in a first process step (left-hand illustration), a first electrically conductive structure, which for the purposes of the invention is preferably referred to as the basic structure (28), is applied to a substrate, for example a card-like object (10). This can be done for example by the use of electrically-conductive paint or a foil transfer method. The basic structure (28) may for example consist of uniform equidistantly arranged individual elements, for example rectangles. In a second process step, the electrically conductive individual elements are galvanically separated from one another at certain locations by laser ablation, that is to say at these locations, the electrically conductive material is selectively ablated. This is illustrated in the center illustration of FIG. 17. This allows unique, i. e. individualized, structures to be produced efficiently. A surprising advantage of this production method is the good optical concealability of the electrically conductive structure (12). Even after overprinting or covering the electrically conductive structure (12) by means of a laminate or label, electrically conductive structures (12) may possibly remain visible to the human eye in conventional production and/or printing methods under backlight conditions. If the structure (12) is distributed over the entire surface and separated only at certain locations by a thin laser cut, such a structure (12) is much more difficult to identify with the naked eye. The arrow in the right-hand illustrations shows a possible operating track on the card-like objects generated in this way by means of laser ablation, wherein the operating track can be arranged, for example, centrally or on one side of the electrically conductive structure (12). Preferably, no electrically conductive material is ablated in the area of the planned operating track, so that an input with an input means (not shown) due to the galvanic connection within the individual element (14) of the electrically conductive structure (12) can be transmitted in the area of an operative contact of the structure (12), where the input can be Detected by the surface sensor (not shown). It is preferred in this preferred embodiment of the invention that the relative movement (20) between input means and card-like object (10) takes place in the area in which no electrically conductive material is ablated.

FIG. 18 shows by way of example a further method for applying an electrically conductive structure (12) to a card-like object (10). In particular, it is possible by means of the methods exemplified in FIGS. 17 and 18 to retrospectively individualize electrically conductive structures (12) on a card-like object (10), i. e., for the purposes of the invention, preferably, to process an initially applied electrically conductive basic structure such that the electrically conductive structures (12) of different card-like objects (10) differ from one another, and this difference can be detected by a surface sensor (22). For the purposes of the invention, it may also be preferred to make distinguishable from one another a plurality of electrically conductive structures (12) arranged on a card-like object (10).

In the method illustrated in FIG. 18, electrically conductive bridges are retrospectively attached to the card-like object (10). For this purpose, in a first step, an electrically conductive basic structure is applied to a card-like object (10), the substrate. The electrically conductive basic structure is applied to the card-like object, for example, by the use of electrically conductive paint or by foil transfer methods. The basic structure preferably comprises equidistant individual elements (14) which may be designed, for example, in rectangular and/or strip-shaped form and which have interruptions at certain locations. A possible preferred embodiment of such a basic structure is shown in the left-hand illustration of FIG. 18. In a second process step, the interruptions can be selectively printed by means of electrically conductive paint, whereby they are advantageously galvanically or capacitively interconnected, as shown in the center illustration of FIG. 18. A possible operating track in this preferred embodiment of the invention preferably may be arranged in such an area of the electrically conductive structure (12) in which there are no interruptions in all the individual elements (14) of the electrically conductive structure (12). This is shown in the right-hand illustration of FIG. 18.

FIG. 19 shows a preferred embodiment of the card-like object (10), in which the final shape of the electrically conductive structure (12) or its individual elements (14), is generated by punching. The punching contour is shown in the center illustration as a dashed line. In particular, FIG. 19 shows how a new electrically conductive structure (12, right) can be generated from a previously existing electrically conductive basic structure (28, left) through a punching process.

FIG. 20 shows a preferred embodiment of the card-like object (10), in which the card-like object (10) comprises the electrically conductive structure (12) and an RFID tag which is arranged between the individual elements of the electrically conductive structure (12).

FIG. 21 shows a preferred embodiment of the card-like object (10) in which the electrically conductive structure (12) comprises individual elements (14) wholly or partly made of a second material, the second material having different electrical properties than a first material from which the remaining individual elements (14) of the electrically conductive structure (12) are made. The areas of the individual elements (14) which consist of a second material, are shown hatched in the lower part of the figure. Although the geometry or outer shape of the electrically conductive structure, which partially consists of a second material, is congruent with the above-described electrically conductive structure (12), the resulting time-dependent signal (16) is changed from the electrically conductive structure without a second material.

FIG. 22 shows a possible application of the invention in the field of banknote production or in the field of safety-relevant documents, such as identity cards, driving licenses, certificates and the like. The enlarged detail (3-fold magnification) shows a possible configuration variant of the electrically conductive structure (12) and of the confusion pattern. The individual elements of the electrically conductive structure (12) are not completely filled in this example, but implemented as a honeycomb structure. Within the electrically conductive structure (12), the individual honeycombs are galvanically interconnected or touch each other and thus constitute autonomous electrically conductive elements. On the card-like object (10), an optical confusion pattern is applied in addition to the electrically conductive structure (12). The confusion pattern also consists of honeycomb-shaped elements. However, these elements are not galvanically interconnected and thus do not affect the deflection and/or the modulation of the time-dependent signal.

FIG. 23 shows a possible embodiment of the card-like object (10) with objects that can specify a possible operating track for the user of the object (10) or the system comprising the card-like object (10) and a capacitive surface sensor (not illustrated). Depending on which operating track is chosen, another time-dependent signal is caused on the surface sensor (not shown) because different individual elements (14) of the electrically conductive structure (12) are brought into operative contact.

In the example shown in FIG. 23, for example, a number sequence can be specified on the card-like object (10), along which the user executes the relative movement (20) and touches or moves the card-like object (10) which rests on the surface sensor (not shown), which preferably results in an operating track. The sequence of numbers, for example, can be redefined in each application by the device which includes the surface sensor, and thus enables safety-related applications that are to be secured by means of a TAN (transaction number).

FIG. 24 shows a preferred embodiment of the card-like object (10) comprising an electrically conductive structure (12) in which the card-like object is at least partially wrapped around another object. This embodiment is of interest, for example, for thicker substrate materials, which may for example be greater than 1 mm.

FIG. 25 shows a preferred embodiment of the invention in which there is a multilayer card structure in the form of a plastic card. This card structure forms the card-like object (10) in the preferred embodiment of the invention shown in FIG. 25. For the purposes of this embodiment, it is preferred that the conductive structure (12) is arranged within the card-like object (10) and the individual elements (14) of the electrically conductive structure (12) are preferably arranged around further safety features on the card-like object.

Figure 26:
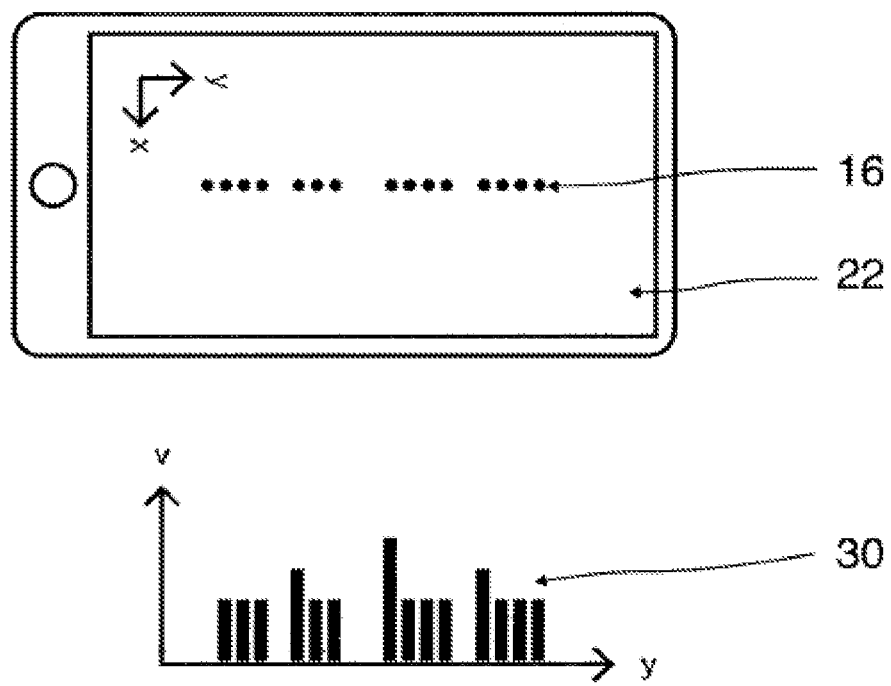

FIG. 26 shows a surface sensor (22) as part of a smartphone. In FIG. 26a, the time-dependent signal (16) is shown graphically on the display of the smartphone. The individual touch events are shown as individual points. FIG. 26b shows the associated speed profile (30) of the time-dependent signal (16). The speed was calculated relative to the previous touch event for each individual touch event using the coordinates and the time stamp, and displayed in the form of a bar chart. The larger the bar, the higher the local speed of the time-dependent signal (16) on the surface sensor (22).

Figure 27:
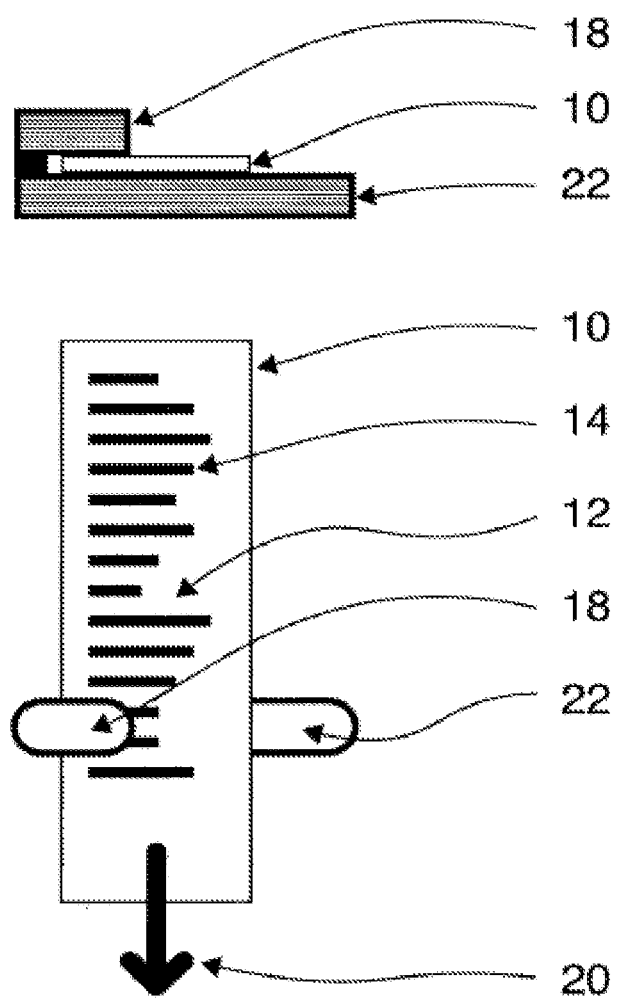

FIG. 27 shows an embodiment in which the input means (18) is part of the capacitive surface sensor (22), or the input means (18) is connected to the capacitive surface sensor (22). The upper diagram shows the surface sensor, input device and card-like object in cross-section. The lower diagram shows the top view. The card-like object (10) is moved relative to the input means (18) by a relative movement (20). In this embodiment, the card-like object (10) can also be provided as a roll material, which is characterized by a significantly greater length compared to the width of the object. The individual elements (14) of the electrically conductive structure thus gradually come into operative contact with the input means (18), whereby advantageously a time-dependent signal (not shown) is generated on the capacitive surface sensor (22).

LIST OF REFERENCE NUMERALS 10 card-like object
12 electrically conductive structure
14 individual elements
16 time-dependent signal
18 input means
20 relative movement
22 surface sensor
24 first active contact
26 second active contact
28 electrically conductive basic structure
30 speed profile

The invention claimed is:

1. A method for generating a time-dependent signal (16) on a capacitive surface sensor (22), characterized in that a card-like object (10) which can be placed on the capacitive surface sensor (22), has an electrically conductive structure (12) comprising a plurality of individual elements (14), which are arranged on the card-like object (10), wherein the time-dependent signal (16) is established by the arrangement of the individual elements (14) on the card-like object (10) and generated by a relative movement (20) between an input means (18) and the card-like object (10), wherein the method comprises providing a first contact (24) and a second contact (26), wherein the first contact (24) exists between the card-like object (10) and the capacitive surface sensor (22), and the second contact (26) exists between the card-like object (10) and the input means (18), wherein at least the second contact (26) is formed dynamically in that a relative movement between the input means (18) and the card-like object (10) takes place, such that the input means (18) moves across the plurality of individual elements (14) of the electrically conductive structure (12).

2. A method for identifying a card-like object (10), comprising the steps of
a) providing the card-like object (10) with an electrically conductive structure (12) comprising a plurality of individual elements (14),
b) placing the card-like object (10) on a capacitive surface sensor (22), whereby a first contact (24) is formed,
c) performing a relative movement (20) between an input means (18) and the card-like object (10), thereby forming a dynamic second contact (26),
d) generating a time-dependent signal (16) on the capacitive surface sensor (22) as a function of the relative movement (20), and
e) evaluating the time-dependent signal (16) by the device which includes the surface sensor (22), for identifying the card-like object (10),
wherein the time-dependent signal (16) which is generated on the capacitive surface sensor (22), is modulated by the arrangement of the individual elements (14) on the card-like object (10) in that the time-dependent signal (16) resulting from the relative movement (20) between the input means (18) and the card-like object (10) is changed relative to a reference input made with the input means (18) without using the card-like object (10).

3. The method according to claim 2, characterized in that the method further comprises providing a first contact (24) and a second contact (26), wherein the first contact (24) exists between the card-like object (10) and the capacitive surface sensor (22), and the second contact (26) exists between the card-like object (10) and the input means (18), wherein at least the second contact (26) is formed dynamically.

4. The method according to claim 2, characterized in that the first contact (24) and the second contact (26) exist simultaneously, and the card-like object (10) is arranged between the surface sensor (22) and input means (18).

5. The method according to claim 2, characterized in that the resulting time-dependent signal (16) on the capacitive surface sensor (22) comprises a quantity of touch inputs and the resulting time-dependent signal (16) with respect to position, speed, direction, and/or shape of the touch input, and/or interruption of the signal, frequency, and/or signal strength is at least partially changed relative to a reference signal which is established by a reference input with the input means (18) without using the card-like object (10).

6. The method according to claim 1, characterized in that the first contact (24) and the second contact (26) exist simultaneously, and the card-like object (10) is arranged between the surface sensor (22) and input means (18).

7. The method according to claim 1, characterized in that the resulting time-dependent signal (16) on the capacitive surface sensor (22) comprises a quantity of touch inputs and the resulting time-dependent signal (16) with respect to position, speed, direction, and/or shape of the touch input, and/or interruption of the signal, frequency, and/or signal strength is at least partially changed relative to a reference signal which is established by a reference input with the input means (18) without using the card-like object (10).

8. A card-like object (10) characterized in that
the card-like object (10) has an electrically conductive structure (12) comprising a plurality of individual elements (14) which are arranged on the card-like object (10), wherein the individual elements (14) of the electrically conductive structure (12) are formed with respect to size, spacing and shape so that a time-dependent signal (16) on a capacitive surface sensor (22) resulting from a relative movement (20) between an input means (18) and the card-like object (10) is changed relative to a reference input made with the input means (18) without using the card-like object (10).

9. The card-like object (10) according to claim 8, characterized in that
the electrically conductive structure (12) comprises at least two galvanically separated individual elements (14), wherein the individual elements (14) are arranged in a plane.

10. The card-like object (10) according to claim 8, characterized in that
the individual elements (14) of the electrically conductive structure (12) are formed essentially by rectangles, which are arranged essentially parallel to one another.

11. The card-like object (10) according to claim 8, characterized in that
the individual elements (14) of the electrically conductive structure (12) have a width from 0.1 mm to 20 mm and/or have a spacing of 0.1 mm to 30 mm.

12. The card-like object (10) according to claim 8, characterized in that
the individual elements (14) of the electrically conductive structure (12) have a width of 0.1 mm to 6 mm.

13. The card-like object (10) according to claim 8, characterized in that
the electrically conductive structure (12) is produced in a multistage process comprising the following steps:
a) applying an electrically conductive basic structure (28) to a substrate by means of a foil transfer method or electrically conductive paint, and
b) selectively removing parts of the electrically conductive base structure (28) by means of a laser, whereby an electrically conductive structure (12) is obtained with individual elements (14) having spatially separated areas.

14. The card-like object (10) according to claim 8, characterized in that
the electrically conductive structure (12) is produced in a multistage process comprising the following steps:
a) applying an electrically conductive basic structure (28) to a substrate by means of a foil transfer method or electrically conductive paint, and
b) selectively applying electrically conductive bridges and/or additional electrically conductive elements by means of inkjet printing by means of which electrically conductive paint is applied to the card-like object (10), whereby an electrically conductive structure (12) with individual elements (14) is obtained.

15. A use of the card-like object (10) according to claim 8 for generating a time-dependent signal (16) on a capacitive surface sensor (22) by a relative movement (20) between the input means (18) and the card-like object (10).

16. The use according to claim 15, characterized in that
generating the time-dependent signal (16) on the capacitive surface sensor (22) comprises providing a first contact (24) and a second contact (26), wherein the first contact (24) exists between the card-like object (10) and the capacitive surface sensor (22), and the second contact (26) exists between the card-like object (10) and the input means (18), wherein the first contact (24) and the second contact (26) exist simultaneously.

17. The use according to claim 15, characterized in that
the input means (18) maintains a fixed position relative to the capacitive surface sensor (22), and/or the input means (18) is part of the surface sensor (22).

18. A system comprising a card-like object (10) according to claim 8 and a capacitive surface sensor (22), characterized in that
the card-like object (10) can be placed on the capacitive surface sensor (22), wherein the card-like object (10) is adapted to generate a time-dependent signal (16) by a relative movement (20) between an input means (18) and the card-like object (10), wherein the time-dependent signal (16) can be modulated by an arrangement of the individual elements (14) on the card-like object (10) and wherein the individual elements (14) of the electrically conductive structure (12) with respect to size, spacing and shape are formed so that the time-dependent signal (16) on the capacitive surface sensor (22) resulting from the relative movement (20) between the input means (18) and the card-like object (10) is changed relative to a reference input made with the input means (18) without using the card-like object (10).

* * * * *